(12) United States Patent
Li et al.

(10) Patent No.: US 10,050,559 B2
(45) Date of Patent: Aug. 14, 2018

(54) CONTROL ARCHITECTURE WITH IMPROVED TRANSIENT RESPONSE

(71) Applicant: LINEAR TECHNOLOGY CORPORATION, Milpitas, CA (US)

(72) Inventors: Jian Li, Milpitas, CA (US); Jindong Zhang, Fremont, CA (US)

(73) Assignee: Linear Technology LLC, Milpitas, CA (US)

( * ) Notice: Subject to any disclaimer, the term of this patent is extended or adjusted under 35 U.S.C. 154(b) by 0 days.

(21) Appl. No.: 15/199,693

(22) Filed: Jun. 30, 2016

(65) Prior Publication Data

US 2017/0207721 A1  Jul. 20, 2017

Related U.S. Application Data

(60) Provisional application No. 62/280,897, filed on Jan. 20, 2016, provisional application No. 62/280,878, filed on Jan. 20, 2016.

(51) Int. Cl.
| | |
|---|---|
| *H02M 3/158* | (2006.01) |
| *H02M 7/537* | (2006.01) |
| *H02M 1/12* | (2006.01) |
| *H02M 1/00* | (2006.01) |
| *H02M 3/156* | (2006.01) |

(52) U.S. Cl.
CPC ............ *H02M 7/537* (2013.01); *H02M 1/12* (2013.01); *H02M 3/1584* (2013.01); *H02M 2001/0009* (2013.01); *H02M 2001/0025* (2013.01); *H02M 2003/1566* (2013.01)

(58) Field of Classification Search
CPC ........ H02M 3/1584; H02M 7/23; H02M 1/08; H02M 2001/0009; H02M 2003/1566
See application file for complete search history.

(56) References Cited

U.S. PATENT DOCUMENTS

| | | | |
|---|---|---|---|
| 5,929,692 A | 7/1999 | Carsten | |
| 6,683,441 B2 * | 1/2004 | Schiff | H02M 3/1584 323/222 |

(Continued)

OTHER PUBLICATIONS

A. Barrado et al., "The Fast Response Double Buck DC-DC Converter (FRDB): Operation and Output Filter Influence", IEEE Transactions on Power Electronics, vol. 20, No. 6, Nov. 2005.

*Primary Examiner* — Emily P Pham
(74) *Attorney, Agent, or Firm* — McDermott Will & Emery LLP

(57) ABSTRACT

A power interface device includes a main switching converter, an auxiliary switching converter, a feedback sense circuit, an error amplifier, a high pass filter, a transient detection circuit, and an auxiliary control circuit. The transient detection circuit is configured to receive the higher frequency component of the transient signal and output an enable signal when the higher frequency component of the transient signal falls outside of an operating window range defined by a first threshold and a second threshold and output a disable signal when the higher frequency component of the transient signal stays within the operating window range. The auxiliary control circuit configured to activate the auxiliary switching converter in accordance with the enable signal and to deactivate the auxiliary switching converter in accordance with the disable signal.

22 Claims, 10 Drawing Sheets

(56) References Cited

U.S. PATENT DOCUMENTS

| | | | |
|---|---|---|---|
| 6,984,969 B1* | 1/2006 | Liu | H02M 3/158 |
| | | | 323/280 |
| 7,233,130 B1 | 6/2007 | Kay | |
| 7,609,040 B1* | 10/2009 | Jain | H02M 3/157 |
| | | | 323/276 |
| 8,441,242 B2* | 5/2013 | Ng | H02M 3/1584 |
| | | | 323/273 |
| 8,917,077 B2 | 12/2014 | Lin et al. | |
| 8,957,514 B1 | 2/2015 | Barnette | |
| 9,256,238 B1 | 2/2016 | Kotikalapoodi | |
| 9,520,788 B2* | 12/2016 | Kobayashi | H02M 3/157 |
| 9,627,976 B2 | 4/2017 | Li | |
| 2002/0036486 A1* | 3/2002 | Zhou | G05F 1/62 |
| | | | 323/272 |
| 2009/0044031 A1 | 2/2009 | Vinayak et al. | |
| 2009/0201000 A1 | 8/2009 | Kojima et al. | |
| 2010/0033153 A1* | 2/2010 | Xing | H02M 3/156 |
| | | | 323/288 |
| 2011/0241636 A1* | 10/2011 | Wu | H02M 3/1584 |
| | | | 323/272 |
| 2014/0184177 A1 | 7/2014 | Tournatory et al. | |
| 2014/0218109 A1 | 8/2014 | Wimpenny | |
| 2016/0211750 A1* | 7/2016 | Coleman | H02M 1/15 |
| 2016/0248327 A1* | 8/2016 | Li | H02M 3/1584 |
| 2016/0248328 A1* | 8/2016 | Zhang | H02M 3/1584 |

\* cited by examiner

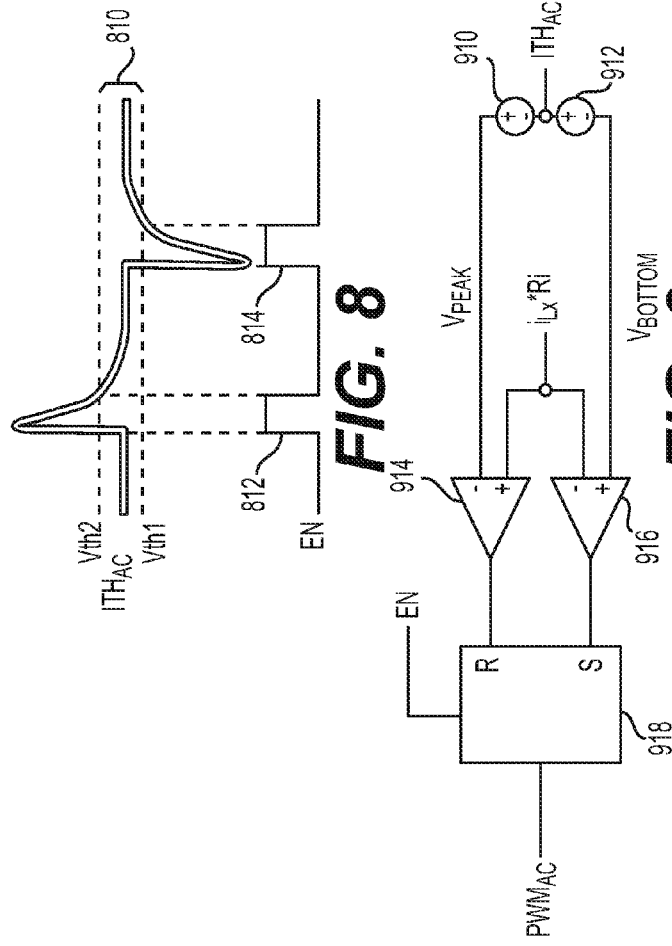
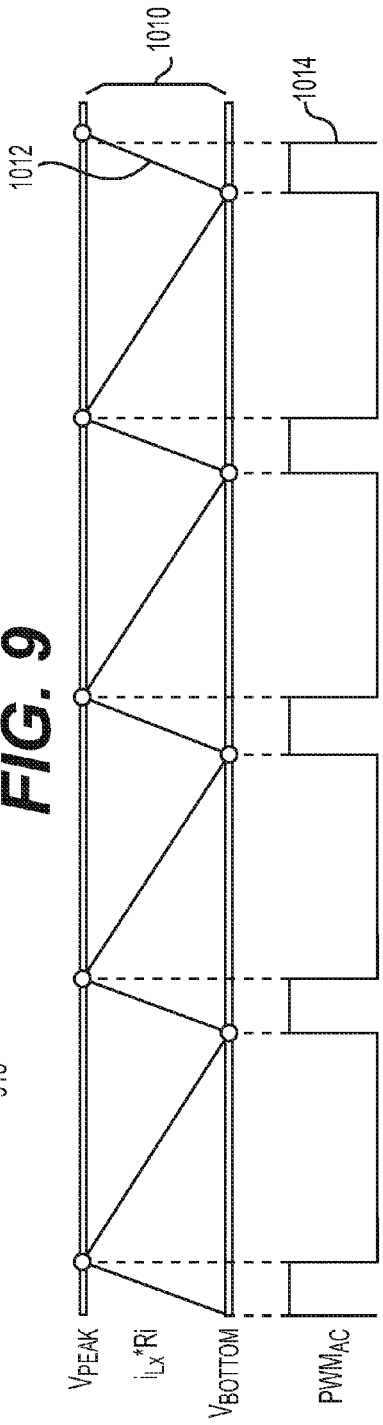
FIG. 8
FIG. 9
FIG. 10

CONTROL ARCHITECTURE WITH IMPROVED TRANSIENT RESPONSE

CROSS REFERENCE TO RELATED APPLICATIONS

This application claims the benefit of priority from U.S. Provisional Application Ser. No. 62/280,897, filed Jan. 20, 2016, and entitled "Control Architecture With Improved Transient Response" and U.S. Provisional Application Ser. No. 62/280,878, filed Jan. 20, 2016, and entitled "Fast Transient Power Supply With a Separated High Frequency and Low Frequency Path Signals," which are incorporated by reference herein in their entirety.

BACKGROUND

A power supply system includes a power source, a load device, and a power interface device connecting the electrical power source to the load device. The power source may include a battery, a power grid, a solar photovoltaic cell, an AC generator, and/or an output of front-end power converter. The power interface device may be configured to increase or decrease the voltage of the power source to provide a suitable voltage for the load device. The power interface device may be a boost converter or a buck converter or any other converter. The load device may include a resistive load, a magnetic load, a capacitive load, a heater. In one implementation, the load device may be a low voltage but a high current load device such as, for example, computer central processing unit (CPU). This type of load device may have many load transient conditions.

During a load transient condition, the current of the load device may substantially change within a very short time period. For example, during the transient condition, the current of the load device may increase from 0 A to 100 A, or decrease from 100 A to 0 A, in less than one microsecond. These sudden changes in current can create large voltage variation at the load device and can cause the output voltage to swing outside of the regulated operating window of the load device.

To minimize transient variations, in one implementation, a large power capacitor may be added to the output of the power supply system. The capacitor may source or sink the necessary current during the transient condition and therefore reduce voltage variation caused by the load transient. To this end, the output capacitor is useful in supplementing the inductor's slowly rising current to meet the increase in current demand from the load device. Similarly, the output capacitor is useful in sinking the current to meet the sudden decrease in current from the load device. Capacitors, however, are expensive and as such may increase cost or size of the system.

In another implementation, the converter may be pushed to run at a higher bandwidth to respond to a load transient quickly. However, a switching mode converter bandwidth is limited by its switching frequency. Therefore, to push the converter to run at the higher bandwidth, the converter has to operate at a higher switching frequency. This means more power loss because each time there is a turn on/off of the switch, there is a power loss. As such, the power supply system is also limited by the power loss of the power converter placed between the power source and the load device.

Hence, a need exists for a power supply system capable of providing a fast response to the transient condition of the load device while increasing the efficiency and reducing costs and size.

SUMMARY

In one general aspect, the instant application describes a power interface device that includes a main switching converter coupled to an input terminal and an output terminal and configured to operate at a first switching frequency to source current from the input terminal to the output terminal; an auxiliary switching converter coupled to the input terminal and the output terminal in parallel with the main switching converter and configured to operate at a second and higher switching frequency than the first switching frequency to source current from the input terminal to the output terminal; and a feedback sense circuit configured to sense an output voltage at the output terminal. The power interface device further includes an error amplifier configured to receive the sensed output voltage and a reference voltage and output a transient signal based on the sensed output voltage and the reference voltage and a high pass filter configured to receive the transient signal and output a higher frequency component of the transient signal. The power interface device further includes a transient detection circuit configured to receive the higher frequency component of the transient signal and output an enable signal when the higher frequency component of the transient signal falls outside of an operating window range defined by a first threshold and a second threshold and output a disable signal when the higher frequency component of the transient signal stays within the operating window range; and an auxiliary control circuit configured to activate the auxiliary switching converter in accordance with the enable signal to source current from the input terminal to the output terminal during the transient and to deactivate the auxiliary switching converter in accordance with the disable signal.

The above general aspect may include one or more of the following features. For example, The transient detection circuit may include a first comparator configured to compare the higher frequency component of the transient signal with the first threshold and output a first enable signal if the higher frequency component is lower than the first threshold; a second comparator configured to compare the higher frequency component of the transient signal with the second threshold and output a second enable signal if the higher frequency component is higher than the second threshold; and a logic gate configured to output the enable signal upon receiving the first enable signal or the second enable signal.

The first threshold may be lower than the second threshold. The first comparator may be configured to output a first disable signal if the higher frequency component is higher than the first threshold. The second comparator may be configured to output a second disable signal if the higher frequency component is lower than the second threshold. The logic gate may be configured to output the disable signal upon receiving the first disable signal and the second disable signal.

The auxiliary control circuit may include a third comparator configured to compare a peak voltage with a sensed inductor voltage of the auxiliary switching converter and output a reset signal upon determining the sensed inductor voltage corresponds to the peak voltage; a fourth comparator configured to compare a bottom voltage with the sensed inductor voltage of the auxiliary switching converter and output a set signal upon determining the sensed inductor voltage corresponds to the bottom voltage; and a second logical circuit configured to receive the set, reset, and enable signals and in response generate a pulse width modulated signal for driving the auxiliary switching converter.

The pulse width modulated signal may include an activate signal and a deactivate signal. The activate signal may be generated in response to the enable signal and the set signal to source current from the input terminal to the output terminal. The deactivate signal may be generated in response to the enable signal and the reset signal to sink current from the output terminal to a ground terminal.

The power interface device may further include a buffer configured to provide electrical impedance transformation from the feedback sense circuit to the auxiliary control circuit; a low pass filter configured to output a lower frequency component of the transient signal; and a gain amplifier configured to receive the transient signal and the lower frequency component of the transient signal and output the higher frequency component of the transient signal. The auxiliary control circuit may include a current-mode control circuit. The main switching converter and the auxiliary switching converter may include current-mode switching regulators.

The main switching converter and the auxiliary switching converter may include step-down, current mode, switching regulators configured to convert a higher input voltage of the input terminal to a lower voltage, the lower voltage being the output voltage. The main switching converter may include a first main switch, a second main switch, and a main inductor. The first main switch at one end may be coupled to the input terminal and at another end is coupled to a main node. The second main switch at one end may be coupled to the main node and at another end is coupled to a ground terminal. The main inductor at one end may be coupled to the main node and at another end is coupled to the output terminal.

The auxiliary switching converter may include a first auxiliary switch, a second auxiliary switch, and an auxiliary inductor. The first auxiliary switch at one end may be coupled to the input terminal and at another end may be coupled to an auxiliary node. The second auxiliary switch at one end may be coupled to the auxiliary node and another end may be coupled to the ground terminal. The auxiliary inductor at one end may be coupled to the auxiliary node and at another end may be coupled to the output terminal.

The auxiliary switching regulator may be configured to source a fast transient high frequency current during a transient detected at a load device and source a fast transient high frequency current with substantially zero low frequency current outside of the transient. The transient may include a sudden increase or decrease in load current.

The first and second main switches and the first and second auxiliary switches may include FET switches. The feedback sense circuit may include a plurality of resistors and capacitors configured to sense the output voltage and generate a feedback voltage. The error amplifier may be configured to receive the feedback voltage and the reference voltage, and generate the transient signal when the feedback voltage and the reference voltage are not substantially equal to each other.

The power interface device may further include a low pass filter configured to receive the transient signal and output a lower frequency component of the transient signal; and a main control circuit configured to control the main switching converter based on the lower frequency component of the transient signal. The main control circuit may include a main comparator circuit configured to compare the lower frequency component of the transient signal with a sensed low frequency inductor voltage sourced by the main switching converter and generate a main pulse-width signal for driving the main switching converter. The main pulse-width signal may enable the main switching converter to source a low frequency current tracking the lower frequency component of the transient signal to the output terminal.

The second logical circuit may be configured to turn OFF the auxiliary switching converter in response to receiving the disable signal from the transient detection circuit. The transient detection circuit may further include a noise filter configured to filter out noise from the higher frequency component of the transient signal.

In another general aspect, the instant application describes a power supply system. The power supply system includes a power source; a load device configured to receive power from the power source; and a power interface device configured to connect the power source to the load device and change a first voltage provided by the power source to a second voltage for operating the load device.

The power interface device includes: a main switching converter coupled to the power source and the load device and configured to operate at a first switching frequency to source current from the power source to the load device; an auxiliary switching converter coupled to the power source and the load device in parallel with the main switching converter and configured to operate at a second and higher switching frequency than the first switching frequency to source current from the power source to the load device; a feedback sense circuit configured to sense an output voltage at the load device; an error amplifier configured to receive the sensed output voltage and a reference voltage and output a transient signal based on the sensed output voltage and the reference voltage; a high pass filter configured to receive the transient signal and output a higher frequency component of the transient signal; a transient detection circuit configured to receive the higher frequency component of the transient signal and output an enable signal when the higher frequency component of the transient signal exceeds a threshold and output a disable signal when the higher frequency component of the transient signal does not exceed the threshold; and an auxiliary control circuit configured to activate the auxiliary switching converter in accordance with the enable signal to source current from the input terminal to the output terminal during the transient and to deactivate the auxiliary switching converter in accordance with the disable signal.

The above general aspect may include one or more of the following features. The transient detection circuit may include a first comparator configured to compare the higher frequency component of the transient signal with a first threshold and output a first enable signal if the higher frequency component is lower than the first threshold; a second comparator configured to compare the higher frequency component of the transient signal with a second threshold and output a second enable signal if the higher frequency component is higher than the second threshold; and a logic gate configured to output the enable signal upon receiving the first enable signal or the second enable signal.

The first threshold and the second threshold may be configured to provide an operating window such that when the higher frequency component of the transient signal falls outside of the operating window, either the first or the second enable signal is generated. The first threshold may be lower than the second threshold. The first comparator may be configured to output a first disable signal if the higher frequency component is higher than the first threshold. The second comparator may be configured to output a second disable signal if the higher frequency component is lower than the second threshold. The logic gate may be configured to output the disable signal upon receiving the first disable signal and the second disable signal.

The auxiliary control circuit may include a third comparator configured to compare a peak voltage with a sensed inductor voltage of the auxiliary switching converter and output a reset signal upon determining the sensed inductor voltage corresponds to the peak voltage; a fourth comparator configured to compare a bottom voltage with the sensed inductor voltage of the auxiliary switching converter and output a set signal upon determining the sensed inductor voltage corresponds to the bottom voltage; and a second logical circuit configured to receive the set, reset, and enable signals and in response generate a pulse width modulated signal for driving the auxiliary switching converter.

BRIEF DESCRIPTION OF DRAWINGS

The drawing figures depict one or more implementations in accord with the present teachings, by way of example only, not by way of limitation. In the figures, like reference numerals refer to the same or similar elements.

FIG. 8 illustrates an exemplary first threshold $V_{th1}$ and second threshold $V_{th2}$ shown in FIG. 7;

FIG. 9 illustrates an exemplary circuit implementation of the auxiliary control circuit shown in FIG. 7;

FIG. 10 illustrates $V_{peak}$ and $V_{bottom}$ shown in FIG. 9 to define an operating window within which the sensed inductor voltage may oscillate;

DETAILED DESCRIPTION

Figure 1:
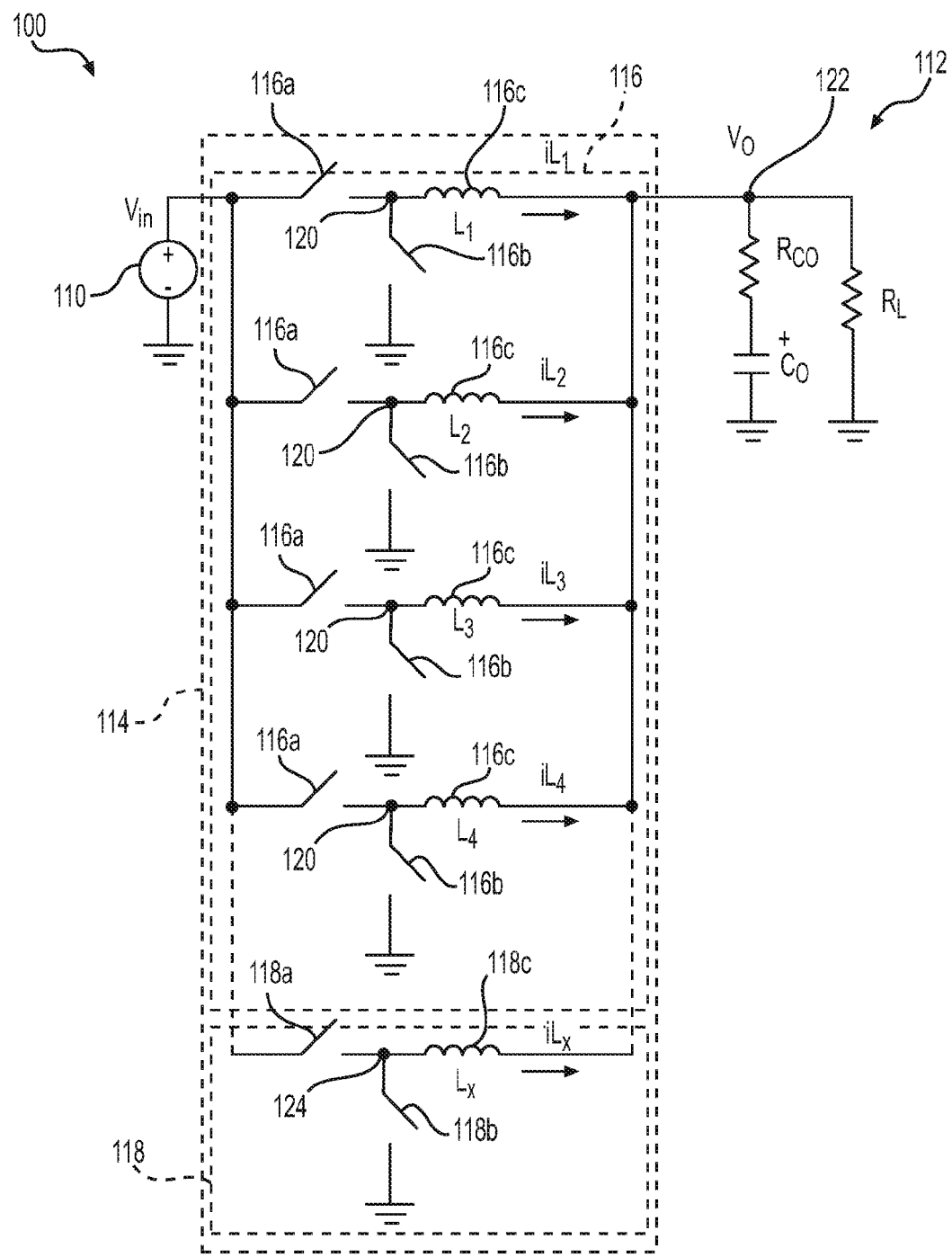
FIG. 1 illustrates an exemplary power supply system with a fast transient response including a main switching converter and an auxiliary switching converter.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuit have been described at a relatively high-level, without detail, in order to avoid unnecessarily obscuring aspects of the present teachings.

There is a continuing search for a power supply system having a fast response to a transient condition at a load device with an improved efficiency while reducing solution size and cost and increasing supply power density. The load device may have different power requirements. This naturally means the power supply system may have to run as efficient as possible both to reduce size and to reduce input power to save energy and increase efficiency. To this end, the power supply system may include a main switching converter and an auxiliary switching converter running in parallel with each other. The main switching converter may run at a first switching frequency and the auxiliary switching converter may run at a second switching frequency. The second switching frequency may be higher than the first switching frequency. Therefore, the main switching converter may have a higher efficiency (e.g., less power switching loss) than that of the auxiliary switching converter. In contrast, the auxiliary switching converter may have a better transient performance (e.g., a faster transient response) in response to a transient at the load device than that of the main switching converter. Since the auxiliary switching converter may have a higher switching loss than that of the main switching converter, the auxiliary switching converter may not be utilized to provide the low frequency current to the load device during steady-state operation. Instead, the auxiliary switching converter may only be used to deal with the transients to sink or source additional current with sudden increase or decrease in the load current.

In one implementation, as discussed with respect to FIGS. 1-5, the auxiliary switching converter may operate both during the transient and outside of the transient. During the transient, the auxiliary switching converter may source or sink high frequency current to respond to the sudden increase or decrease in the load current. During the steady-state condition, the auxiliary switching converter may source or sink high frequency current with a zero average or low frequency current to reduce power loss associated with the auxiliary switching converter. In this manner, in the steady-state condition, the power loss associated with the low frequency current in the auxiliary switching converter is reduced or eliminated and as such the total power loss in the auxiliary switching converter is minimized. The auxiliary switching converter, however, may still experience switching power loss due to the switching of its switches in the steady-state condition.

In another implementation, as discussed with respect to FIGS. 6-12B, to further reduce the power loss associated with the auxiliary switching converter, the auxiliary switching converter may only operate during the transients to save steady state power. In this implementation, the auxiliary switching converter may be turned OFF during the steady-state conditions and as such may substantially eliminate its power loss associated with the higher switching frequency during the steady-state operation.

FIG. 1 illustrates an exemplary power supply system 100 with a fast transient response including a main switching converter and an auxiliary switching converter. The power supply system 100 includes a power source 110, a load device 112, and a power interface device 114 connecting the power source 110 to load device 112.

The power source 110 is configured to output a certain standard voltage. The power source 110 may be an electrical outlet. Most single phase alternating-current electrical outlets in the world supply power at 210-240 V or at 100-120 V. Alternatively, the power source 110 may include other types of power sources such as, for example, one or more of a battery, a solar photovoltaic, or an AC generator. Regardless of the type of the power source 110, the power source 110 often provides a voltage different from the required voltage for the load device 112. The provided voltage may be higher or lower than the required voltage for the load device 112. To match the source voltage to the load voltage, the power supply system 100 includes the power interface 114. The power interface 114 is configured to make the voltage of the power source 110 compatible with the voltage of the load device 112.

As noted above, the appropriate voltage for the load device 112 may be higher or lower than the voltage of the electrical power source 110. In one implementation, the appropriate voltage for the load device 112 is lower than the voltage of the electrical power source 110. In one specific example, the power interface device 114 is configured to reduce the voltage of the electrical power source 110 from 12 volts to 0.85 volt for the load device 112. The output current from the power interface device 114 may be 100 A.

The load device 112 may include a resistive load, a magnetic load, a capacitive load, a heater, or other electric or electronic devices. Most electronic devices require between 1.5 and 24 volts DC. These devices can work either from batteries or mains. In either case, the power interface device 114 may be used to match the voltage requirements of these electronic devices with the voltage provided from the power source 110. The power interface device 114 may be internal to the load device 112 or may be external to the load device 112. Similarly, the power interface device 114 may be internal to the power source 110 or may be external to the power source 110. In another implementation, the power interface device 114 may be a stand-alone integrated circuit.

The power interface device 114 may include a transformer, a rectifier, or switched-mode power supplies. The switched-mode power supplies have become widespread and are smaller and lighter than the once-universal transformer converters, and are often designed to work from AC mains at any voltage between 100 and 250 V. Additionally, because switched-mode power supplies are typically rectified to operate at a DC voltage, they are minimally affected by the frequency of the mains (50 vs 60 Hz). The foregoing description assumes that power interface device 114 includes switched-mode power supplies; however, as noted above, the power interface device 114 may include circuits other than switched-mode power supplies.

The power interface device 114 includes a main switching converter 116 and an auxiliary switching converter 118. The main switching converter 116 includes four single phase switching regulators connected in parallel to each other connecting the power source 110 to the load device 112. Although the specific example shows four single phase switching regulators, the power interface device 114 may include greater or fewer than four single phase switching regulators. The power interface device 114 may be configured to operate in at least two modes of operation: a normal mode at high to moderate load current and a low power mode at low load current. In normal mode, all four switching regulator circuits in the main switching converter 116 may be ON, sourcing current to the load device 112 through their respective inductors. Each phase may source similar low frequency current to the load device 112. In the low power mode, three of the switching regulator circuits in the main switching converter 116 may be OFF and one switching regulator circuit may be ON, sourcing 100% of the output current of the power interface device 114. The low power mode can improve the efficiency of the power interface device 114 at light load currents. This is because fewer switching regulator circuits are ON in the low power mode than that of the normal mode and therefore there is less switching loss in the lower power mode.

Each of the single phase switching regulators in the main switching converter 116 may include a first switch 116a, a second switch 116b, and an inductor 116c. The first switch 116a and the second switch 116b may be MOSFET switches. The MOSFET switches may be n-channel MOSFET or p-channel MOSFET switches. The first switch 116a may be connected at one end to the Vin and at another end to a first node 120. The second switch 116b may be connected at one end to the first node 120 and at the other end to the ground terminal. The inductor 216c may be connected at one end to the first node 120 and at the other end to the output terminal 122. The output terminal 122 may be connected to the output capacitor $C_o$ and the load resistance $R_L$.

The auxiliary switching converter 118 is connected in parallel with the main switching converter 116. The auxiliary switching converter 118 may include a first switch 118a, a second switch 118b, and an inductor 118c. The first switch 118a and the second switch 118b may be MOSFET switches. The MOSFET switches may be n-channel MOSFET or p-channel MOSFET switches. The first switch 118a may be connected at one end to $V_{in}$ and at another end to a first node 124. The second switch 118b may be connected at one end to the first node 124 and at the other end to the ground terminal. The inductor 118c may be connected at one end to the first node 124 and at the other end to the output terminal 122.

The power interface device 114 is configured to supply output current to a load coupled to the output terminal 122 at a regulated voltage Vout. To this end, each of the first switch 116a and the second switch 116b in the main switching converter 116 are switched ON and OFF by a first driver circuit. The switches 116a and 116b may be driven out of phase with respect to each other to supply current to a load coupled to the output terminal 122. Similarly, the first switch 118a and the second switch 118b in the auxiliary switching converter 118 are switched ON and OFF by a second driver circuit. The switches 118a and 118b may be driven out of phase with respect to each other to supply current to a load coupled to the output terminal 122. The switches 116a and 116b may be configured to run at a first switching frequency. The switches 118a and 118b may be configured to run at a second switching frequency.

The second switching frequency may be faster than that of the first switching frequency. To this end, the auxiliary switching converter 118 may have a higher bandwidth and faster transient response to the transients at the load device 112 than that of the main switching converter 116. Since the auxiliary switching converter 118 has a higher or faster switching frequency than that of the main switching converter 116, the auxiliary switching converter 118 naturally has a greater power loss. The first and second switching frequencies may correspond to a predetermined fixed frequency.

In order to increase efficiency, the power interface device 114 may be configured to control the auxiliary switching converter 118 during the transient differently from the steady-state condition. During the transient, the power interface device 114 may be configured to control the auxiliary switching converter 118 to source or sink high frequency current, where the average sourced or sunk current is not zero, to the output terminal 122 to respond to a sudden increase or decrease of the load current. During the steady-state condition, the power interface device 114 may be configured to control the auxiliary switching converter 118 to source or sink high frequency current, where the average sourced or sunk current is zero, to the output terminal 122. In this manner, the power loss associated with the auxiliary switching converter 118 during the steady-state may be minimized.

In order to enable such a control, the power interface device 114 may include two separate control feedback mechanisms. The first control feedback mechanism may be configured to control the main switching converter 116 based on the sensed output voltage or current output. The second control feedback mechanism may be configured to control the auxiliary switching converter 118 based on the sensed output voltage or current output. The second control mechanism may be configured to detect the transient, generate corresponding transient signal and separate a higher frequency component of the transient signal from its lower frequency component. The second control mechanism may then use the higher frequency component of the transient signal to drive the auxiliary switching converter 118 during the transient. In response, the auxiliary switching converter 118 may source or sink high frequency current to the output terminal 122. Outside of the transient, the second control mechanism may drive the auxiliary switching converter 118 such that the average low frequency (or DC) current provided by the steady state ripple of the auxiliary switching converter 118 is zero.

The transient may include a scenario in which there is a sudden increase or decrease in the load current or voltage. To illustrate one example, during a 25 A current load step at the output, the transient may correspond to the beginning of the load step, where there is a sudden increase in the load current before reaching a first steady-state level at the increased level of 25 A. Similarly, the transient may correspond to the ending of the load step where there is a sudden decrease in the load current before reaching a second steady-state level. The second steady-state may correspond to a state prior to the 25 A current load step or to a new state higher or lower than the state prior to the 25 A current load step.

Figure 2:
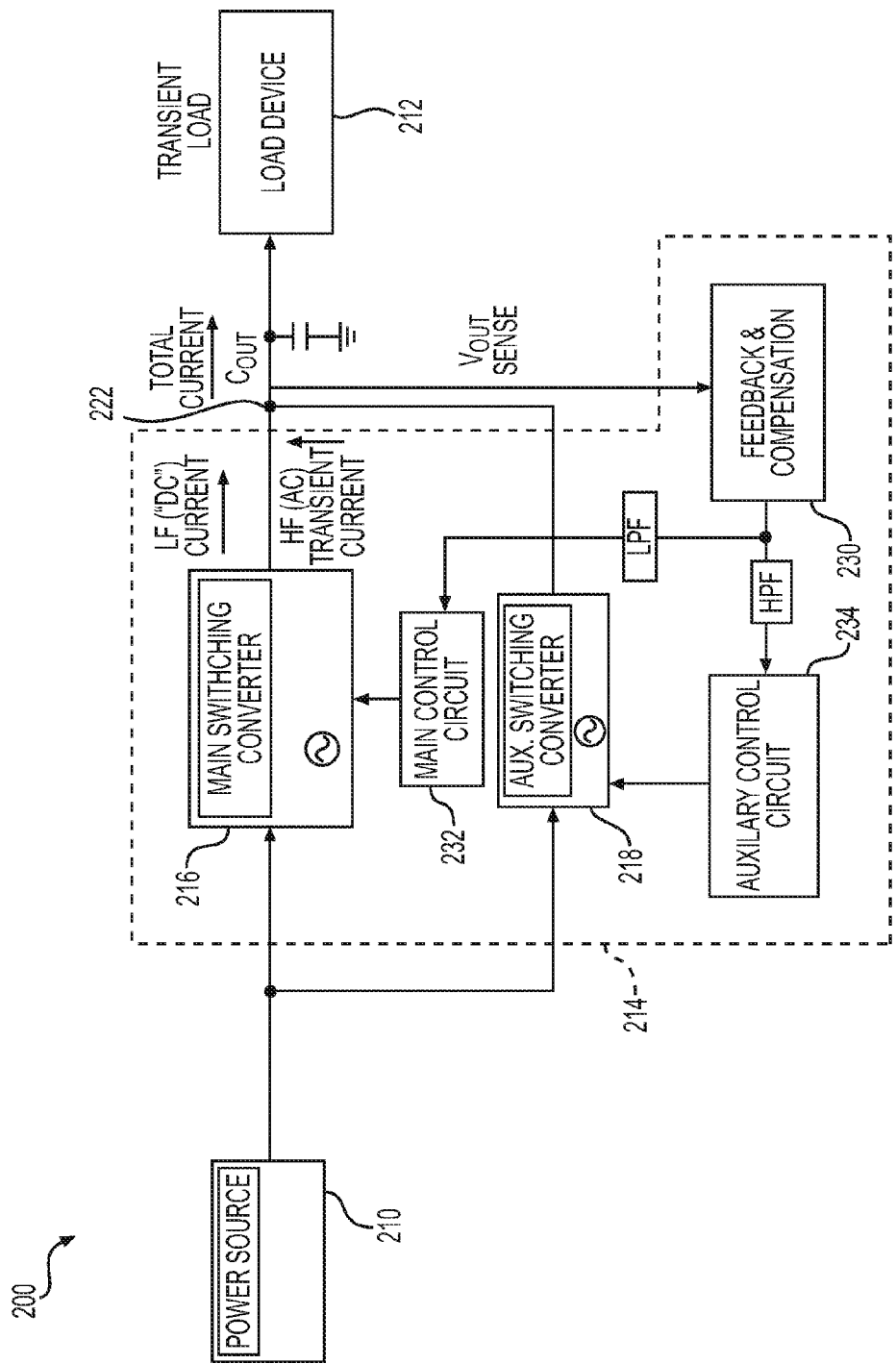
FIG. 2 illustrates an exemplary power supply system including two separate control signals for driving the main switching converter and the auxiliary switching converter.

FIG. 2 illustrates an exemplary power supply system 200 including two separate control signals for driving the main switching converter and the auxiliary switching converter. The power supply system 200 includes a power source 210, a load device 212, and a power interface device 214 connecting the power source 210 to the load device 212. The power source 210 and the load device 212 are similar to the power source 110 and the load device 112. Therefore, for the sake of clarity and brevity of description, they are not described in more detail. The power interface device 214 includes a main switching converter 216, an auxiliary switching converter 218, a feedback and compensation circuit 230, a main control circuit 232, and an auxiliary control circuit 234.

The main switching converter 216 is connected in parallel with the auxiliary switching converter 218. The main switching converter 216 may be configured to source or sink a low frequency current. To this end, the main switching converter 216 may be switching at a low frequency to maintain high efficiency of the main switching converter 216. The auxiliary switching converter 218 may be configured to source or sink a high frequency current. To this end, the auxiliary switching converter 218 may be switching at a high frequency to achieve high loop bandwidth and track high frequency transient. As noted above, the auxiliary switching converter 218 has more power loss associated with it than the main switching converter 216 due to its higher switching frequency. To reduce power loss associated with the auxiliary switching converter 218, in the steady-state operation, the auxiliary switching converter 218 may be operated to source or sink near zero low frequency (or DC) current. As such, during the steady-state operation, the power loss of the auxiliary switching converter 218 may be limited to switching loss and loss associated with the high frequency (or AC) steady-state inductor current ripple.

The power interface device 214 also includes the feedback and compensation circuit 230. The feedback and compensation circuit 230 is connected at one end to the output terminal 222 and at the other end to the main control circuit 232 and the auxiliary control circuit 234. The feedback and compensation circuit 230 is configured to detect transients at the load device 212 and generate a transient signal. The transient signal includes a lower frequency component and a higher frequency component. To separate the lower frequency component of the transient signal from the higher frequency component of the transient signal, the power interface device 214 may include a low pass filter ("LPF") and a high pass filter ("HPF"), in one implementation. The LPF may be connected at one end to the feedback and compensation circuit 230 and at the other end to the main control circuit 232. The HPF may be connected at one end to the feedback and compensation circuit 230 and at the other end to the auxiliary control circuit 234. In another implementation, the LPF may be eliminated and the compensation network of the feedback and compensation circuit 230 may be used to filter out or attenuate the higher frequency component of the transient signal.

The main control circuit 232 is configured to drive the main switching converter 216 based on the lower frequency component of the transient signal to respond to the transient condition. The auxiliary control circuit 234 is configured to drive the auxiliary switching converter 218 based on the higher frequency component of the transient signal to respond to the transient condition. In this manner, both the main switching converter 216 and the auxiliary switching converter 218 are controlled to provide a stable $V_{out}$ at the output terminal 222 as quickly as possible during the transient.

To illustrate one specific example, if there is a sudden increase in the load current due to a positive current load step (e.g., from 75 A to 100 A), the auxiliary control circuit 234 may operate the auxiliary switching converter 218 with an increased duty cycle to increase the sourced high frequency current from the power source 210 to the output terminal 222 until the total output current reaches the desired level of 100 A. Due to its higher switching frequency and higher loop bandwidth, the auxiliary switching converter 218 may source current faster to the output terminal 222 from the power source 210 than the main switching converter 216. The sourced current from the auxiliary switching converter 218 may track the higher frequency component of the transient signal. Once the current at the output terminal 222 reaches the desired level (e.g., 100 A) and the load device 212 reaches the steady-state condition, the auxiliary switching converter 218 may continue to operate based on its original duty cycle and may provide a zero low frequency (or DC) current output. To this end, a current or voltage threshold level may be set for the auxiliary switching converter 218 in the steady-state operation such that the average low frequency (or DC) current of the auxiliary switching converter 218 associated with the high frequency current ripple is zero. As such, the average sourced current from the auxiliary switching converter 218 may be non-zero during the transient and substantially zero outside the transient during the steady-state operation. That is, once the transient ends (e.g., the new current threshold of 100 A is reached), the auxiliary switching converter 218 may source substantially zero low frequency (or DC) current.

In keeping with the previous example, the main control circuit 232 may also operate the main switching converter 216 with an increased duty cycle to increase the sourced low frequency current to the output terminal 222 until the total output current reaches the desired level of 100 A. The sourced current from the main switching converter 216 may track the lower frequency component of the transient signal. Once the transient ends (e.g., the new current threshold of 100 A is reached), the main switching converter 216 continues to source and/or sink current to maintain the stability of $V_{out}$ in accordance with its fixed switching frequency and its original duty cycle. The duty cycle may be defined in accordance with Equation 1 below:

$$D = V_{out}/V_{in} \qquad \text{(Equation 1)}$$

To illustrate another specific example, if there is a sudden decrease in the load current due to a negative current load step (e.g., from 100 A to 75 A), the auxiliary control circuit 234 may operate the auxiliary switching converter 218 with a decreased duty cycle to increase sunk current from the output terminal 222. Specifically, the auxiliary control circuit 234 may issue a control signal to the auxiliary switching converter 218 to sink current from the output terminal 222 to the ground terminal until the total output current reaches the desired level of 75 A. As mentioned above, due to its higher switching frequency and higher loop bandwidth, the auxiliary switching converter 218 may sink current faster from the output terminal 222 to the ground terminal than the main switching converter 216. The sunk current by the auxiliary switching converter 218 may track the higher frequency component of the transient signal. Once the current at the output terminal 222 reaches the desired level (e.g., 75A), the auxiliary switching converter 218 may continue to sink and source high frequency current in accordance with its original duty cycle and may provide a zero average lower frequency (or DC) current output. As such, the average sunk current from the auxiliary switching converter 218 may be non-zero during the transient and substantially zero outside the transient during the steady-state operation. That is, once the transient ends (e.g., the new current threshold of 75 A is reached), the auxiliary switching converter 218 may sink substantially zero low frequency (or DC) current.

In keeping with the previous example, the main control circuit 232 also operates the main switching converter 216 with a decreased duty cycle to increase the sunk current from the output terminal 222 to the ground terminal. The sunk current by the main switching converter 216 may track the lower frequency component of the transient signal. Once the transient ends (e.g., the new current threshold of 25 A is reached), the main switching converter 216 continues to supply low frequency current to maintain the stability of $V_{out}$ in accordance with its fixed switching frequency and original duty cycle.

Figure 3:
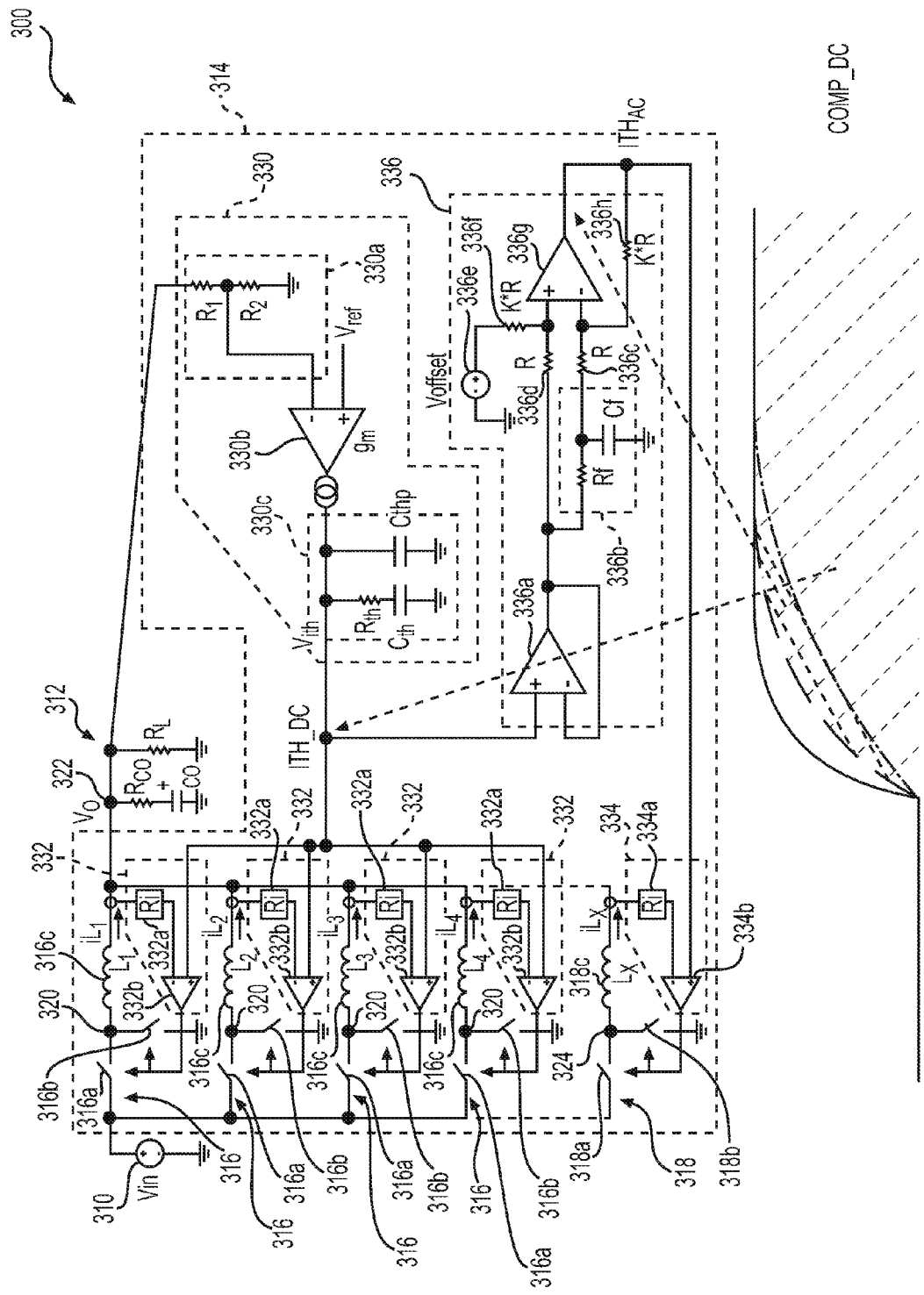
FIG. 3 illustrates an exemplary circuit implementation of the power supply system shown in FIG. 2 having a fast transient response.

FIG. 3 illustrates an exemplary circuit implementation 300 of the power supply system 200 shown in FIG. 2 having a fast transient response. As shown, the circuit implementation 300 includes a power source 310, a load device 312, and a power interface device 314 connecting the power source 310 to the load device 312. The power interface device 314 includes a plurality of main switching converters 316 and an auxiliary switching converter 318 connected in parallel with each other. The power interface device 314 also includes a feedback and compensation circuit 330, a main control circuit 332, an auxiliary control circuit 334, and a high pass filter 336.

The main switching converter 316 and the auxiliary switching converter 318 can be classified as pulse-width-modulation (PWM) type, producing a pulse train having a fixed frequency and a variable pulse width. The main switching converter 316 is configured to run at a lower switching frequency fsw than that of the auxiliary switching converter 318. The auxiliary switching regulator 318 is configured to run at a higher frequency than that of the main switching regulator 316 to quickly respond to the transients at the load device 312. Although the specific example shows four main switching converters 316 and a single auxiliary switching converter 318, the power interface device 300 may include more or less than four main switching converters 316 and more than one auxiliary switching converter 318. Any number of such regulators may be connected in parallel with each other.

The switching converters 316 and 318 may be current-mode switching regulators that include an inductor. The switching converters 316 and 318 may be synchronous switching regulators but they also may be non-synchronous switching regulators. In one specific example, the switching converters 316 and 318 may be a step-down, current mode, switching regulator in which the input voltage $V_{in}$ is greater than the output voltage $V_{out}$.

Each of the main switching converter 316 may include a first switch 316a, a second switch 316b, and an inductor 316c. The first switch 316a and the second switch 316b may be power FET switches. The power FET switches may be n-channel FET or p-channel FET switches. Similarly, the auxiliary switching converter 318 may include a first switch 318a, a second switch 318b, and an inductor 318c. The first switch 318a and the second switch 318b may be power FET switches. The FET switches may be n-channel FET or p-channel FET switches. Although FET type switches are described, other appropriate technologies may also be used.

In the main switching converter 316, the first switch 316a may be connected at one end to the $V_{in}$ and at another end to a node 320. The second switch 316b may be connected at one end to the node 320 and at the other end to the ground terminal. The inductor 316c may be connected at one end to the node 320 and at the other end to the output terminal 322. The output terminal 322 may be connected to the output capacitor $C_{out}$ and the load resistance $R_L$.

In the auxiliary switching regulator 318, the first switch 318a may be connected at one end to $V_{in}$ and at another end to a node 324. The second switch 318b may be connected at one end to the node 324 and at the other end to the ground terminal. The inductor 318c may be connected at one end to the node 324 and at the other end to the output terminal 628.

The power interface device 314 is configured to source or sink output current to the load device 312 coupled to the output terminal 322 at a regulated voltage Vout. To this end, the first switch 316a and the second switch 316b in the main switching converter 316 are switched ON and OFF by the main control circuit 332. The switches 316a and 316b may be driven out of phase with respect to each other to source or sink current to the load device 312 coupled to output terminal 322. Similarly, the first switch 318a and the second switch 318b in the auxiliary switching regulator 318 are switched ON and OFF by an auxiliary control circuit 334. The switches 318a and 318b may be driven out of phase with respect to each other to source or sink current to the load device 312 coupled to output terminal 322.

The switches 316a and 316b are configured to run at a first switching frequency. The switches 318a and 318b are configured to run at a second switching frequency. The second switching frequency may be higher than the first switching frequency to respond to the transients at the output terminal 322 more quickly. That is, due to the faster switching frequency, the auxiliary switching converter 318 is configured to source or sink current to or from the output terminal 322 more quickly than the main switching converter 316. Due to the higher frequency, the auxiliary switching converter 318 has more power loss than the main switching converter 316. To reduce the power loss associated with the auxiliary switching converter 318, the operation of the auxiliary switching converter 318 may be controlled such that in the steady-state operation, the auxiliary switching converter 318 provides substantially zero low frequency (or DC) current to the output terminal 322 as discussed above.

Although not shown, additional circuit may be added to the power interface device 300 to provide a brief dead-time or blanking interval between the moment that one switching transistor turns OFF and the moment that the other switching transistor turns ON. When the switches 316a, 318a are ON and the switches 316b, 318b are OFF, current flows from the $V_{in}$ to the output terminal 322 through the inductors 316c, 318c in each of the switching converters 316 and 318. In this scenario, the rate of change of inductor current 316c and 318c over time may be equal to (Vin−Vout)/L. When the switches 316a, 318a are OFF and the switches 316b, 318b are ON, current flows from the ground terminal to output terminal 322 though the inductors 316c and 318c. In this scenario, the rate of change of inductor currents 316c and 318c over time may be equal to −Vout/L. In each of the above-described scenarios, the total current at the output terminal 322 may be the cumulative inductor currents through inductors 316c and 318c.

The power interface device 314 also includes the feedback and compensation mechanism 330. The feedback and compensation mechanism 330 is connected at one end to the output terminal 322 and at the other end to the main control circuit 332 and the auxiliary control circuit 334. In one implementation, as shown in FIG. 2, a low pass filter may be connected in between the feedback and compensation mechanism 330 and the main control circuit 332. The low pass filter is configured to filter out the higher frequency component of the transient signal ITH and provide the main control circuits 332 with only the low frequency component of the transient signal. In another implementation, the components of the compensation circuit may be selected such that the transient signal ITH has an attenuated higher frequency component such that it can be directly supplied to the main control circuits 332 as shown in FIG. 3.

The feedback and compensation circuit 330 includes a feedback sense circuit 330a, an error amplifier 330b, and a compensation circuit 330c. The feedback sense circuit 330a is configured to sense the $V_{out}$ through a network of resistors $R_1$ and $R_2$. The network of resistors $R_1$ and $R_2$ form a resistor divider and scale the signal $V_{out}$ to make it proportional to $V_{ref}$. In one implementation, the resistor $R_1$ is equal to 4.16 kilohms and $R_2$ is equal to 10 kilohms.

Although not shown, the feedback sense circuit 330a may also include a network of capacitors $C_1$ and $C_2$. The optional capacitors $C_1$ and $C_2$ may be provided to make the resistor divider frequency dependent. This frequency dependent divided $V_{out}$ may be referred to as feedback voltage $V_{fb}$. The feedback voltage $V_{fb}$ and a reference voltage $V_{ref}$ are provided as input to the error amplifier gm (shown as a trans-conductance (gm) amplifier) 330b. In one implementation, the reference voltage $V_{ref}$ is equal to 0.6 volt. The error amplifier 330b may be either a current-output type transconductance amplifier or voltage-output type amplifier.

The error amplifier 330b monitors the feedback voltage $V_{fb}$ that is proportional to $V_{out}$ at its inverting input and a reference voltage $V_{ref}$ at its non-inverting input. The feedback voltage $V_{fb}$ should be approximately equal to the reference voltage $V_{ref}$. When these two voltages are not equal, the amplifier 330b may provide a transient voltage control signal ITH at its output. The output voltage of the amplifier 330b may correspond to the difference between the actual output voltage and the desired output voltage. The output voltage of the amplifier 330b is inverse to the feedback voltage $V_{fb}$. As the feedback voltage $V_{fb}$ decreases, the output voltage of the amplifier 330b increases. As the feedback voltage $V_{fb}$ increases, the output voltage of amplifier 330b decreases. The frequency compensation circuit 330c includes capacitors $C_{th}$ and $C_{thp}$ and a resistor $R_{th}$ to provide frequency compensation for the feedback loop. In one implementation, $C_{th}$ is equal to 1.5 nF, $C_{thp}$ is equal to 100 pF, and resistor $R_{th}$ is equal to 10 kilohms. In the current-mode supply system, instead of voltage, the amplifier 330b may provide transient current control signal at its output. In either case, the transient control signal (current or voltage) is used to control the total output current of converters 316 and 318.

The main control circuit 332 includes a resistor 332a and a comparator 332c. The main control circuit 332 may also include a buffer. The buffer may be configured to provide electrical impedance transformation from the feedback and compensation mechanism 330 to the main control circuit 332. The buffer may be a voltage buffer or a current buffer. The comparator 332c is configured to receive at its non-inverting input either the transient signal ITH or the lower frequency component of the transient signal $ITH_{DC}$ and compare it with the sensed voltage $i_L*R_i$ (low frequency current of inductor 316c*resistance Ri) to generate the PWM signal for power FETs 316a and 316b. The resistor $R_i$ is provided to sense the inductor 316c current and generate the corresponding voltage for comparison with the lower frequency component $ITH_{DC}$ of the transient signal ITH.

If the lower frequency component $ITH_{DC}$ is more than the sensed inductor voltage signal, the comparator 332b may output a first PWM signal. The first PWM signal may be a high signal. The high signal may be provided to the high switch 316a to turn it ON and enable the main switching converter 316 to source additional current to the output terminal 322 with the increased load current. The high signal may also be provided to an inventor connected to the low switch 316b to turn OFF the low switch 316b. At the beginning of the clock cycle, the switch 316a may turn ON with an increased duty cycle until the new current threshold due to the transient is reached. During the time the switch 316a is ON, the low frequency current flows from the power source $V_{in}$ through the switch 316a and inductor 316c to the output terminal 322. As a result, the low frequency current ramps up in the inductor 316c toward the new current threshold.

In this manner, the main switching converter 316 sources low frequency current tracking the lower frequency component $ITH_{DC}$ to reach the new current threshold set by the transient. In one implementation, during the transient, the switch 316a may remain ON and the switch 316b may remain OFF until the new current threshold set by the transient is reached. In another implementation, during the transient, the main switching converter 316 may operate with an increased duty cycle to increase the sourced low frequency current to the output terminal 322. During the increased duty cycle and in response to the high PWM signal, the switches 316a and 316b may alternatively turn ON and OFF to increase the sourced low frequency current to the output terminal 322. The increased duty cycle may correspond to the duty cycle of the PWM signal. The fixed switching frequency of the main switching converter 316 may not be maintained during the transient if the on-time for the switch 316a is longer than the cycle time T, for example.

In one implementation, the main control circuit 332 may activate only one of the main switching converters 316 to source the necessary current to the output terminal 322. In another implementation, the main control circuit 332 may activate more than one of the main switching converters 316 to source the necessary current to the output terminal 322.

If the lower frequency component $ITH_{DC}$ is less than the sensed inductor signal, the comparator 332b may output a second PWM signal. The second PWM signal is a low signal. The low signal may be provided to the high switch 316a to turn it OFF. The low signal may also be provided to the inventor connected to the low switch 316b to turn ON the low switch 316b and enable the main switching converter 316 to sink additional current from the output terminal 322 with the decreased load current. At the beginning of the clock cycle, the switch 316a may turn OFF with a decreased duty cycle and the switch 316b may turn ON until the new current threshold due to the transient is reached. During the time the switch 316b is ON, the low frequency current flows from the output terminal 322 though the inductor 316c to the ground terminal. As a result, the low frequency current ramps down in the inductor 316c toward the new current threshold.

In this manner, the main switching converter 316 sinks low frequency current tracking the lower frequency component $ITH_{DC}$ to reach the new current threshold set by the transient. In one implementation, during the transient, the switch 316a may remain OFF and the switch 316b may remain ON until the new current threshold set by the transient is reached. In another implementation, during the transient, the main switching converter 316 may operate with a decreased duty cycle to increase the sunk low frequency current from the output terminal 322. During the decreased duty cycle and in response to the low PWM signal, the switches 316a and 316b may alternatively turn ON and OFF to increase the sunk low frequency current from the output terminal 322. In either case, the fixed switching frequency of the main switching converter 316 may not be maintained during the transient if the on-time for the switch 316b is longer than the cycle time T, for example.

Once the transient ends (e.g., the new current threshold is reached), the main switching converter 316 continues to source and sink current to maintain the stability of $V_{out}$ in accordance with its fixed switching frequency and a duty cycle. The on-time and the off-time of switches 316a and 316b are determined based on the duty-cycle. In one specific example, the duty-cycle may correspond to the duty-cycle set prior to the transient. To this end, the main switching converter 316 is configured to source and/or sink current both during the transient and steady-state operation.

As noted above, the total output transient control signal ITH output from the feedback and compensation circuit 330 is also passed to the auxiliary control circuit 334 via the high pass filter 336. The high pass filter 336 includes a buffer 336a, a low pass filter 336b, resistors 336c and 336d, an offset voltage 336e, a resistor 336f, an amplifier 336g, and a resistor 336h. The buffer 336a is configured to isolate the auxiliary control circuit 334 from the impedance of the feedback and compensation network 330. The output of the buffer 336a is supplied to the non-inverting terminal of the amplifier 336g through the resistor 336d. The output of the buffer is also supplied to the inverting terminal of the amplifier 336g through the low pass filter 336b and the resistor 336c. The low pass filter 336b includes a resistor $R_f$ and a capacitor $C_f$ and is configured to filter out the higher frequency component $ITH_{AC}$ of the transient signal ITH and forward the lower frequency component $ITH_{DC}$ of the transient signal ITH to the inverting terminal of the amplifier 336g via the resistor 336c. In one specific example, the resistance of the resistor $R_f$ is equal to 1 kilohms and the capacitance of the capacitor $C_f$ is equal to 1 nF.

The lower frequency component $ITH_{DC}$ is subtracted from the transient signal ITH (having both the higher frequency and lower frequency components) and the difference is amplified by a K factor. As such, the output of the amplifier 336g may correspond to the amplified higher frequency component $ITH_{AC}$ of the transient signal ITH. The amplified higher frequency component $ITH_{AC}$ is supplied to the auxiliary control circuit 334.

In one implementation, the resistors 336c, 336d, 336f, and 336h combined together provide a gain factor for the higher frequency component $ITH_{AC}$ of the transient signal ITH. In one specific example, the resistance of the resistors 336c, 336d, 336f, and 336h is equal to 10 kilohms. The factor K may be equal to 30.

The $V_{offset}$ 336e may be provided so that during the steady-state operation, the low frequency (or DC) current of the auxiliary switching converter 318 is substantially zero. To this end, the $V_{offset}$ 336e may be set to a value corresponding to half ripple of the high frequency (or AC) current such that during the steady-state operation average ripple AC current is substantially equal to zero. In one specific example, the $V_{offset}$ 336e is set to 100 millivolt.

The auxiliary control circuit 334 includes a resistor 334a and a comparator 334b. The resistor 334a is provided to sense the inductor 318c current and provide the sensed inductor 318c voltage. The comparator 334b is configured to receive at its non-inverting terminal the amplified higher frequency component $ITH_{AC}$ and at its inverting terminal the sensed inductor 318c voltage. The comparator 334b compares the higher frequency component $ITH_{AC}$ with the sensed inductor 318c voltage.

If the higher frequency component $ITH_{AC}$ is more than the sensed inductor signal, the comparator 334b may output the first PWM signal. The first PWM signal may be a high signal. The high signal may be provided to the high switch 318a to turn it ON and enable the auxiliary switching converter 318 to source additional current to the output terminal 322 with the increased load current. The high signal may also be provided to an inventor connected to the low switch 318b to turn OFF the low switch 318b. At the beginning of the clock cycle, the switch 318a may turn ON with an increased duty cycle until the new current threshold due to the transient is reached. During the time the switch 318a is ON, the high frequency current flows from the power source $V_{in}$ through the switch 318a and inductor 318c to the output terminal 322. As a result, the high frequency current ramps up in the inductor 318c toward the new current threshold.

In this manner, the auxiliary switching converter 318 sources high frequency current tracking the higher frequency component $ITH_{AC}$ to reach the new current threshold set by the transient. In one implementation, during the transient, the switch 318a may remain ON and the switch 318b may remain OFF until the new current threshold set by the transient is reached. In another implementation, during the transient, the auxiliary switching converter 318 may operate with an increased duty cycle to increase the sourced high frequency current to the output terminal 322. During the increased duty cycle and in response to the high PWM signal, the switches 318a and 318b may alternatively turn ON and OFF to increase the sourced high frequency current to the output terminal 322. The increased duty cycle may correspond to the duty cycle of the PWM signal. The fixed switching frequency of the auxiliary switching converter 318 may not be maintained during the transient if the on-time for the switch 318a is longer than the cycle time T, for example. Once the steady-state is reached, the auxiliary switching converter 318 may source and sink high frequency current with substantially zero average low frequency (or DC) current to the load device 312.

If the higher frequency component $ITH_{AC}$ is less than the sensed inductor current signal, the comparator 334b may output a second PWM signal. The second PWM signal is a low signal. The low signal may be provided to the high switch 318a to turn it OFF. The low signal may also be provided to the inventor connected to the low switch 318b to turn ON the low switch 318b and enable the auxiliary switching converter 318 to sink additional current from the output terminal 322 with the decreased load current. At the beginning of the clock cycle, the switch 318a may turn OFF with a decreased duty cycle and the switch 318b may turn ON until the new current threshold due to the transient is reached. During the time the switch 318b is ON, the high frequency current flows from the output terminal 322 though the inductor 318c to the ground terminal. As a result, the high frequency current ramps down in the inductor 318c toward the new current threshold.

In this manner, the auxiliary switching converter 318 sinks high frequency current tracking the higher frequency component $ITH_{AC}$ to reach the new current threshold set by the transient. In one implementation, during the transient, the switch 318a may remain OFF and the switch 318b may remain ON until the new current threshold set by the transient is reached. In another implementation, during the transient, the auxiliary switching converter 318 may operate with a decreased duty cycle to increase the sunk high frequency current from the output terminal 322. During the decreased duty cycle and in response to the low PWM signal, the switches 318a and 318b may alternatively turn ON and OFF to increase the sunk high frequency current from the output terminal 322. In either case, the fixed switching frequency of the auxiliary switching converter 318 may not be maintained during the transient if the on-time for the switch 318b is longer than the cycle time T, for example.

The PWM signals from the main control circuit 332 and the auxiliary control circuit 334 may be provided to a control circuit internal to the main switching converter 316 and auxiliary switching converter 318, respectively. The control circuit uses the PWM signal of the circuit 332 along with a system clock signal to control the state of switches 316a and 316b of the main switching converter 316. Similarly, the control circuit uses the PWM signal of the circuit 334 along with the system clock signal to control the state of switches 318a and 318b of the auxiliary switching converter 318.

If the main switching converter 316 is a peak-current mode regulator, first its low-side switch 316b may be turned OFF and then its high-side switch 316a may be turned ON by internal clock, thereby increasing the current of the inductor 316c. Similarly, if the auxiliary switching converter 318 is a peak-current mode regulator, first its low-side switch 318b may be turned OFF and then its high-side switch 318a may be turned ON by internal clock, thereby increasing the current of the inductor 318c.

If the main switching converter 316 is a valley-current mode regulator, first the high-side switch 316a is turned OFF and then the low-side switch 316b is turned ON by internal clock or timer, thereby decreasing the current of the inductor 316c. Similarly, if the auxiliary switching converter 318 is a valley-current mode regulator, first the high-side switch 318a is turned OFF and then the low-side switch 318b is turned ON by internal clock or timer, thereby decreasing the current of the inductor 318c.

Figure 4:
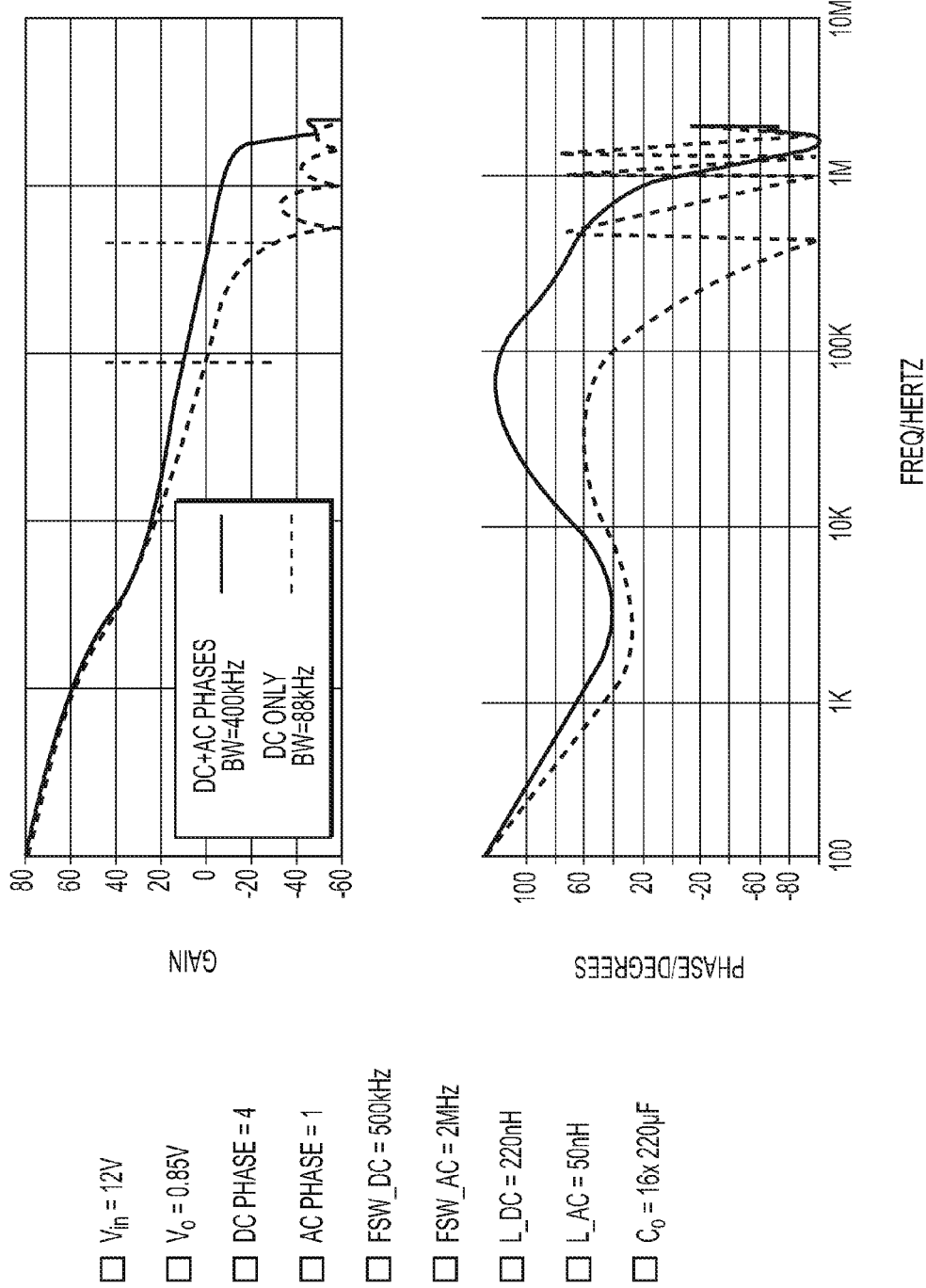
FIG. 4 illustrates a loop gain comparison between a first power supply system having four main switching converters and a single auxiliary switching converter as shown in FIG. 3 and a second power supply system having only four main switching converters.

In one specific example, the power supply system 300 may be configured to meet the following criteria:
Power Supply $V_{in}$=12V
Output Voltage $V_{out}$=0.85V
Number of Main Switching Converters=4
Number of Auxiliary Switching Converters=1
Switching Frequency of Main Switching Converters $F_{sw-DC}$=500 kHz
Switching Frequency of Auxiliary Switching Converter $F_{sw-AC}$=2 MHz
Inductance of Main Switching Converter=220 nH (per phase)
Inductance of Auxiliary Switching Converter=50 nH
Output Capacitance Co=16*220 μF FIG. 4 illustrates a loop gain comparison between a first power supply system having four main switching converters and a single auxiliary switching converter as shown in FIG. 3 and a second power supply system having only four main switching converters. As can be seen, with the addition of the auxiliary switching converter, the bandwidth of the first power supply system can be pushed from 88 k to 400 k Hz. This is why a faster transient is possible. Usually the power supply system is stable when phase margin is greater than zero. In one implementation, it may be desirable to have 40-45 degrees phase. As can be seen, the phase margin of the second power supply system using only the main switching converter at 88 k Hertz is about 45 degrees. In contrast, the phase margin of the first power supply system using the main switching converter in parallel with the auxiliary switching converter is substantially higher, higher than 60 degrees.

Figure 5:
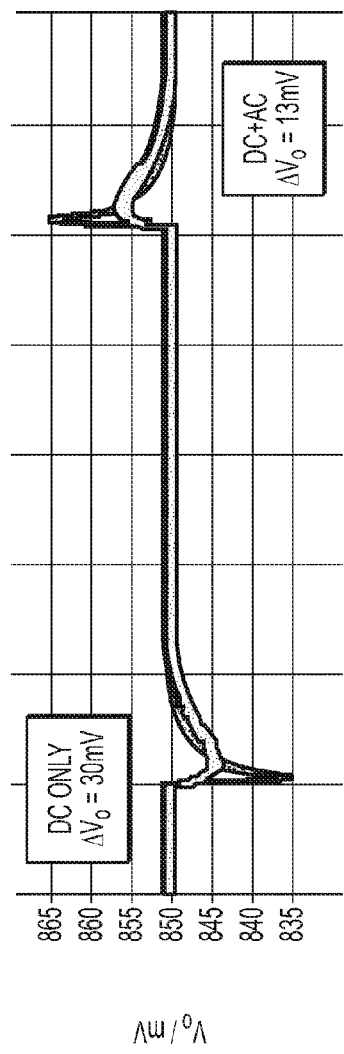
FIG. 5 compares an output voltage spike of a first power supply system having four main switching converters and a single auxiliary switching converter as shown in FIG. 3 with an output voltage spike of a second power supply system having only four main switching converters for a current load step of 25 A.
Figure 5:
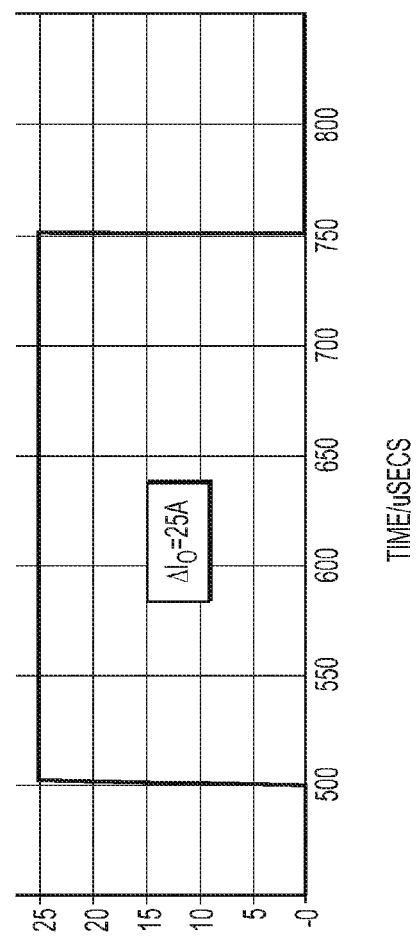

FIG. 5 compares an output voltage spike of a first power supply system having four main switching converters and a single auxiliary switching converter as shown in FIG. 3 with an output voltage spike of a second power supply system having only four main switching converters for a current load step of 25 A. As shown, the output voltage spike 512 of the second power supply system in response to the load step of 25 A is significantly larger than the output voltage spike 514 of the first power supply system in response to the same load step. In one example, the spike may be about 70% less in the first power supply system than the spike in the second power supply system. In another example, the spike may be about 50% less in the first power supply system than the spike in the second power supply system. This is accomplished without a need for a complicated control method or employing an additional AC capacitor to the output between the output terminal and the control loop for the auxiliary switching converter. The AC capacitor is configured to prevent DC or low frequency current from entering the control loop for auxiliary switching converter. The AC capacitor can add to the cost and size of the power supply system. Instead, the power supply system of the instant application as described with respect to FIG. 3 prevents the DC or low frequency current from entering the auxiliary switching converter via a high pass filter.

In the implementations described above, the auxiliary switching converter may source or sink high frequency current, with average low frequency (or DC) current, only during the transient. Outside of the transient, in steady-state operation, the auxiliary switching converter may source or sink high frequency current, with substantially zero low frequency (or DC) current to minimize power loss associated with the higher switching frequency of the auxiliary switching converter. In another implementation, to further minimize power loss associated with the auxiliary switching converter, the auxiliary switching converter may be turned off during steady-state operation. In this implementation, a transient detection circuit may be used to determine when to enable/disable the auxiliary switching converter.

Figure 6:
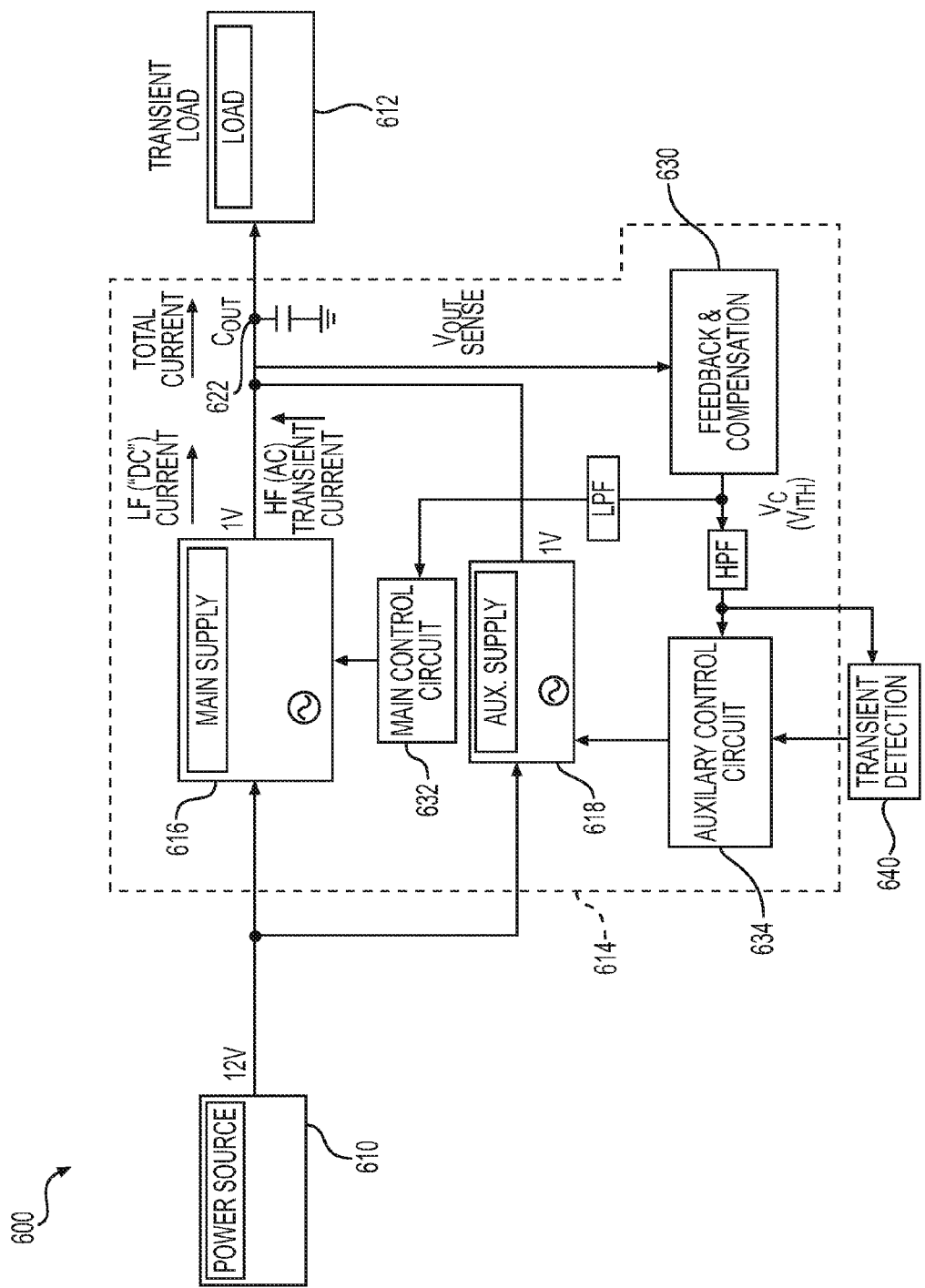
FIG. 6 illustrates another exemplary power supply system configured to provide a fast transient response.

FIG. 6 illustrates another exemplary power supply system 600 configured to provide a fast transient response. The power supply system 600 is similar to the power supply system 200 shown in FIG. 2 with a modified auxiliary control circuit 634 and an additional transient detection circuit 640. To this end, the power supply system 600 includes a power source 610, a load device 612, and a power interface device 614 connecting the power source 610 to the load device 612 at an output terminal 622. The power interface device 614 includes a main switching converter 616, an auxiliary switching converter 618, a feedback and compensation circuit 630, a main control circuit 632, an auxiliary control circuit 634, a LPF, a HPF, and a transient detection circuit 640. The main switching converter 616, the auxiliary switching converter 618, the feedback and compensation circuit 630, the main control circuit 632, the LPF, and the HPF are respectively similar to the main switching converter 216, the auxiliary switching converter 218, the feedback and compensation circuit 230, the main control circuit 232, the LPF, and the HPF shown in FIG. 2. Therefore, for the sake of brevity of description, they are not described in more details.

The transient detection circuit 640 is configured to determine when to enable the auxiliary control circuit 634 to control the auxiliary switching converter 618 to source or sink high frequency current to/from the output terminal 622. In one implementation, the transient detection circuit 640 is configured to receive the higher frequency component $ITH_{AC}$ of the transient signal ITH from the HPF and output an enable signal when the higher frequency component $ITH_{AC}$ of the transient signal ITH falls outsides of a window which is determined by two thresholds and output a disable signal when the higher frequency component $ITH_{AC}$ of the transient signal ITH stay in the window.

The auxiliary control circuit 634 may include a current-mode control circuit configured to generate the PWM signal for the auxiliary switching converter 618. The auxiliary control circuit 634 is configured to activate the auxiliary switching converter 618 in accordance with the enable signal to source or sink current to/from the output terminal 622 during the transient. The auxiliary control circuit 634 is configured to deactivate the auxiliary switching converter 618 in accordance with the disable signal. When deactivated, the auxiliary switching converter 618 is OFF and the switches are disabled.

Figure 7:
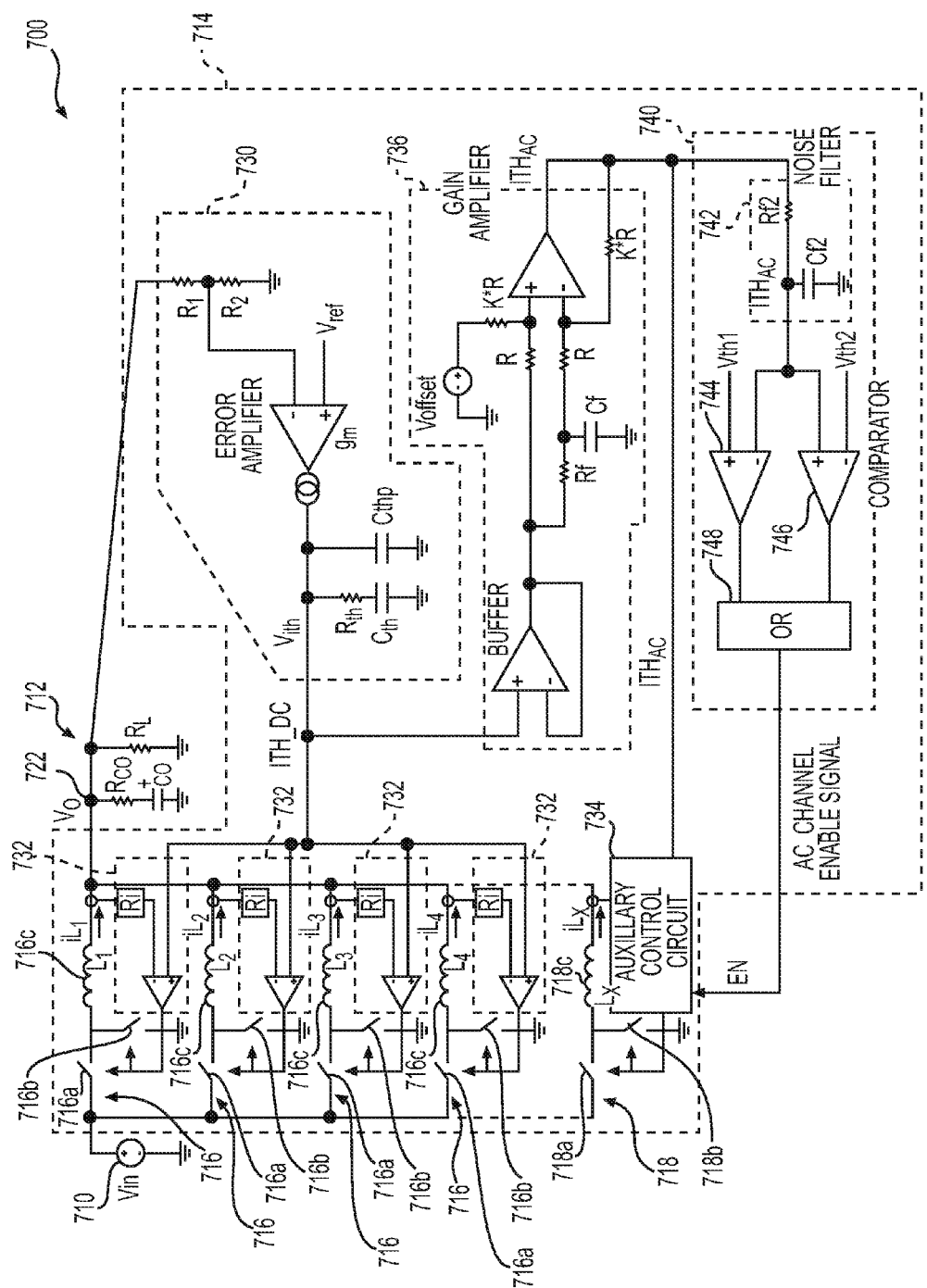
FIG. 7 illustrates an exemplary circuit implementation of the power supply system shown in FIG. 6 having a fast transient response.

FIG. 7 illustrates an exemplary circuit implementation 700 of the power supply system 600 shown in FIG. 6 having a fast transient response. As shown, the power interface of the circuit implementation 700 includes a power source 710, a load device 712, and a power interface device 714 connecting the power source 710 to the load device 712. The power interface device 714 includes a plurality of main switching converters 716 and an auxiliary switching converter 718 connected in parallel with each other. The power interface device 714 also includes a feedback and compensation circuit 730, a main control circuit 732, an auxiliary control circuit 734, and a high pass filter 736, and a transient detection circuit 740.

The main switching converters 716, the auxiliary switching converter 718, the feedback and compensation circuit 730, the main control circuit 732, and the high pass filter 736 are respectively similar to the main switching converters 316, the auxiliary switching converter 318, the feedback and compensation circuit 330, the main control circuit 332, the high pass filter 336. Therefore, for the sake of brevity of description, they are not described in more details.

The transient detection circuit 740 is connected at one end to the output of the high pass filter 736 and at another end is connected to the auxiliary control circuit 734. The transient detection circuit 740 includes a noise filter 742, a first comparator 744, a second comparator 746, and a logic circuit 748. The noise filter 742 includes resistor $R_{f2}$ and a capacitor C. In one implementation, the resistor $R_{f2}$ has 1 kiloohm resistance and the capacitor $C_{f2}$ has 1 nF capacitance. The noise filter 742 is configured to filter out the noise from the higher frequency component $ITH_{AC}$ of the transient signal ITH. The noise may have a higher frequency than the higher frequency component of $ITH_{AC}$ of the transient signal ITH.

The first comparator 744 is configured to compare the higher frequency component $ITH_{AC}$ of the transient signal ITH with a first threshold $V_{th1}$ and output a first enable signal if the higher frequency component $ITH_{AC}$ is lower than the first threshold $V_{th1}$. The second comparator 746 is configured to compare the higher frequency component $ITH_{AC}$ of the transient signal ITH with a second threshold $V_{th2}$ and output a second enable signal if the higher frequency component $ITH_{AC}$ is higher than the second threshold $V_{th2}$.

FIG. 8 illustrates an exemplary first threshold $V_{th1}$ and second threshold $V_{th2}$ shown in FIG. 7. As shown, the first threshold $V_{th1}$ and the second threshold $V_{th2}$ are configured to provide an operating window 810 such that when the higher frequency component $ITH_{AC}$ of the transient signal ITH falls outside of the operating window 810, either the first enable signal 812 or the second enable signal 814 is generated. As shown, the first threshold $V_{th1}$ is lower than the second threshold $V_{th2}$. The first comparator 744 is configured to output a first disable signal if the higher frequency component $ITH_{AC}$ is higher than the first threshold $V_{th1}$. The second comparator 746 is configured to output a second disable signal if the higher frequency component $ITH_{AC}$ is lower than the second threshold $V_{th2}$.

Referring again to FIG. 7, the logic gate 748 may be an OR logic gate and may be configured to output the enable signal upon receiving the first enable signal or the second enable signal. Additionally, the logic gate 748 may be configured to output the disable signal upon receiving the first disable signal and the second disable signal. The enable signal and the disable signal are output to the auxiliary control circuit 734. Upon receiving the enable signal, the auxiliary control circuit 734 enables the auxiliary switching converter 718 to source or sink current to the output terminal 722 by tracking the higher frequency component $ITH_{AC}$ of the transient signal. Upon receiving the disable signal, the auxiliary control circuit 734 disables the auxiliary switching converter 718. In the disable mode, both switches 718a and 718b may be turned OFF and the auxiliary switching converter 718 may not source or sink current.

FIG. 9 illustrates an exemplary circuit implementation 900 of the auxiliary control circuit 734 shown in FIG. 7. The circuit 900 includes an offset voltage sources 910, 912, a first comparator 914, a second comparator 916, and a logic circuit 918. The circuit 900 receives the higher frequency component $ITH_{AC}$ of the transient signal ITH from the transient detection circuit 740. The higher frequency component $ITH_{AC}$ is then offset by the offset voltages 910, 912 to generate a $V_{peak}$ and $V_{bottom}$. In one specific example, the offset voltage may correspond to 4 millivolt.

Referring also to FIG. 10, $V_{peak}$ and $V_{bottom}$ define an operating window 1010 within which the sensed inductor 718c voltage 1012 may oscillate. The peak voltage $V_{peak}$ is input to the inverting terminal of the first comparator 914. The first comparator 914 receives at its non-inverting terminal the auxiliary inductor 718c sensed voltage. The first comparator 914 may be configured to compare the peak voltage $V_{peak}$ with the sensed inductor 718c voltage of the auxiliary switching converter 718 and output a reset signal upon determining the sensed inductor 718c voltage 1012 corresponds to the peak voltage $V_{peak}$. The second comparator 916 may be configured to compare the bottom voltage $V_{bottom}$ with the sensed inductor 718c voltage of the auxiliary switching converter 718 and output a set signal upon determining the sensed inductor 718c voltage 1012 corresponds to the bottom voltage $V_{bottom}$.

The logical circuit 918 is configured to receive the set and reset signals from the comparators 916, 918 respectively and the enable signal from the transient detection circuit 740. In response, the logic circuit 918 may generate a pulse width modulated signal 1014 for driving the auxiliary switching converter 718. The pulse width modulated signal 1014 may include a high signal 1014a and a low signal 1014b. The high signal 1014a may be generated in response to the enable signal and the set signal to turn ON the switch 718a and turn OFF the switch 718b to source current from the power source 710 to the output terminal 722. The set signal may be asserted at the output of the logic circuit 918 until the reset signal is activated by the first comparator 914. Similarly, the reset signal may be asserted at the output of the logic circuit 918 until the set signal is activated by the second comparator 916. The low signal 1014b may be generated in response to the enable signal and the reset signal to turn OFF the switch 718a and turn ON the switch 718b to sink current from the output terminal 722 to the ground terminal.

In this manner, during the transient when the transient detection circuit 740 issues an enable signal, the auxiliary control circuit 734 generates the PWM signal 1014. The PWM signal 1014 causes the auxiliary switching converter 718 to generate the inductor voltage 1012, oscillating between the $V_{peak}$ and $V_{bottom}$. However, when the transient detection circuit 740 issues a disable signal, the auxiliary control circuit 734 does not issue the PWM signal 1014. As a result, the auxiliary switching converter 718 remains OFF. To this end, the control modulation of the auxiliary control circuit 734 of the power supply system 700 is different from the control modulation of the auxiliary control circuit 334 of the power supply system 300. The control modulation of the auxiliary control circuit 334 uses a peak current to control the auxiliary switching converter. The top switch 318a may be turned ON at the beginning of the clock cycle with an increased duty cycle until the peak current is reached. Once the peak current is reached, the top switch 318a is turned OFF and the auxiliary switching converter 318 resumes operation based on its original duty cycle. In the control modulation of the auxiliary control circuit 734, both the turn ON and OFF of the top switch 718a is controlled with the use of $V_{peak}$ and $V_{bottom}$. In this manner, clock latency associated with the control modulation of the auxiliary control circuit 334 may be reduced or eliminated in the auxiliary control circuit 734.

The above-described implementation only enables the auxiliary switching converter during the transient. Therefore, it minimizes the power loss associated with the auxiliary switching converter channel in steady state, without sacrificing the solution transient performance. In this implementation, the steady state ripple may not be impacted by the auxiliary switching converter channel. The auxiliary switching converter channel may be further sized down due to the power loss reduction to save costs and solution size. Air core inductor may be used for the auxiliary switching converter since the inductance is small.

Figure 11A:
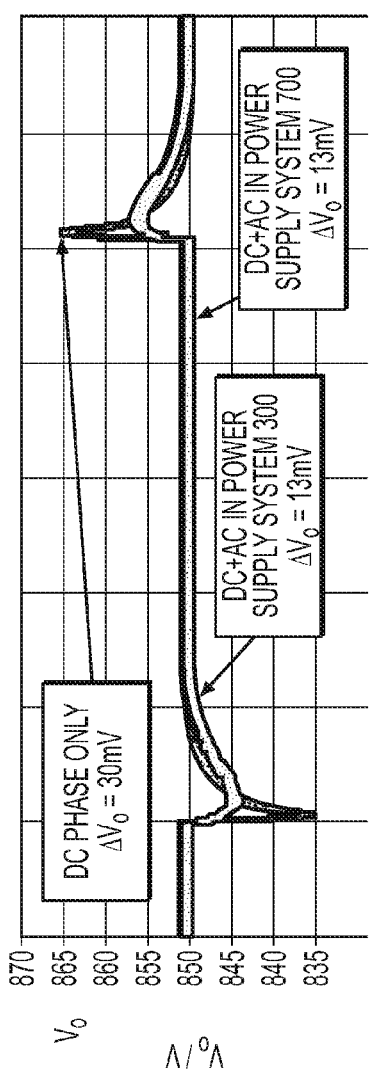
FIGS. 11A and 11B illustrate exemplary load transient simulation waveforms comparison between (i) a first power supply system having four main switching converters, (ii) a second power supply system having four main switching converters and one auxiliary switching converter as shown in FIG. 3, and (iii) a third power supply system having four main switching converters and one auxiliary switching converter as shown in FIG. 7 in response to a current load step of 25 A within 1 µs.
Figure 11B:
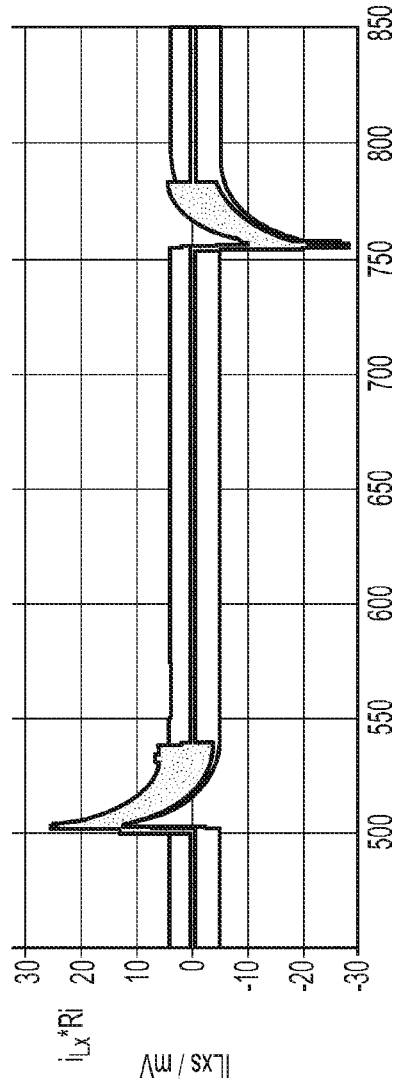

In one specific example, the power supply system 300 may be configured to meet the following criteria:
Power Supply $V_{in}$=12V
Output Voltage $V_{out}$=0.85V
Number of Main Switching Converters=4
Number of Auxiliary Switching Converters=1
Switching Frequency of Main Switching Converters $F_{sw-DC}$=500 kHz
Switching Frequency of Auxiliary Switching Converter $F_{sw-AC}$=2 MHz
Inductance of Main Switching Converter=220 nH (per phase)
Inductance of Auxiliary Switching Converter=50 nH
Output Capacitance Co=16*220 µF FIGS. 11A and 11B illustrate exemplary load transient simulation waveforms comparison between (i) a first power supply system having four main switching converters, (ii) a second power supply system 300 having four main switching converters and one auxiliary switching converter as shown in FIG. 3, and (iii) a third power supply system 700 having four main switching converters and one auxiliary switching converter as shown in FIG. 7 in response to a current load step of 25 A within 1 µs. FIG. 11A compares an output voltage spike of the first power supply system, the second power supply system 300, and the third power supply system 700. As shown, the output voltage spike of the first power supply system is substantially more than the output voltage spike of the second and third power supply systems. The output voltage spikes of the second and third power supply systems are substantially the same. As such, the power supply system 700 can achieve the same transient improvement as the power supply system 300 but with a higher efficiency since the power supply system 700 may only run the auxiliary switching converter 718 during transient to save steady state power. Furthermore, smooth transition during ON/OFF of the auxiliary switching converter 718 may be achieved.

FIG. 11B compares the higher frequency inductor current during the transient in the power supply system 300 and the power supply system 700. The high frequency current is provided by the auxiliary switching converters 318 and 718 in response to the higher frequency component $ITH_{AC}$. The high frequency current tracks the higher frequency component $ITH_{AC}$. To this end, the auxiliary switching converters 318, 718 may only source or sink current during the transients (e.g., sources current in response to the positive edge of the load step and sinks current in response to the negative edge of the load step). As shown, the high frequency current waveforms provided by the auxiliary switching converters 318 and 718 are substantially identical.

Figure 12A:
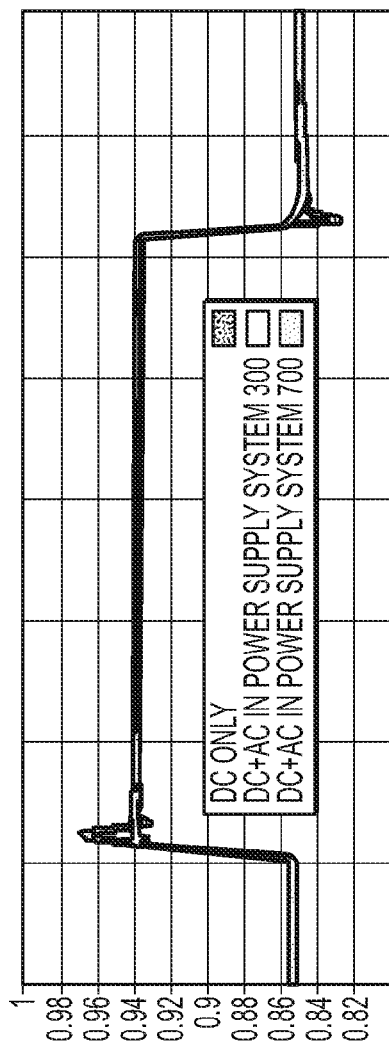
FIGS. 12A and 12B illustrate exemplary voltage step simulation waveforms comparison between (i) a first power supply system having four main switching converters, (ii) a second power supply system having four main switching converters and one auxiliary switching converter as shown in FIG. 3, and (iii) a third power supply system having four main switching converters and one auxiliary switching converter as shown in FIG. 7 in response to a voltage step of 10% within 5 µs.
Figure 12B:
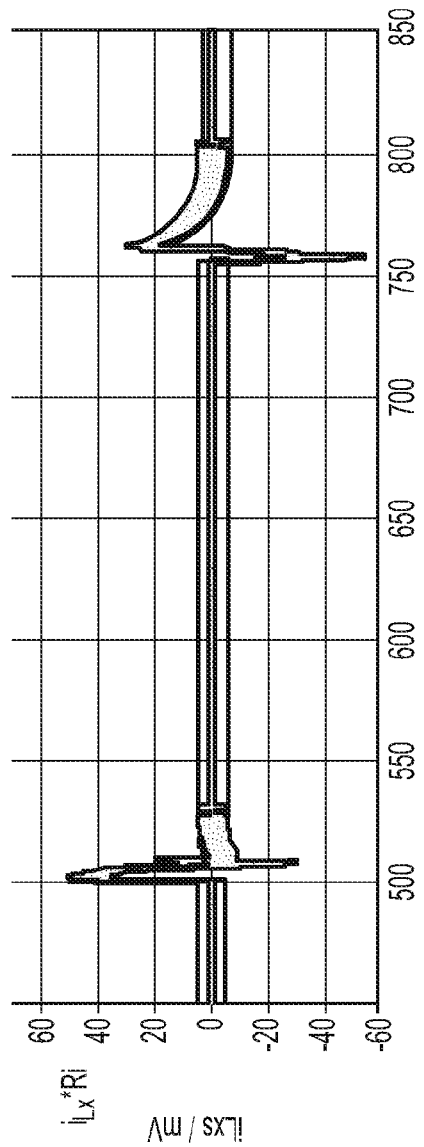

FIGS. 12A and 12B illustrate exemplary voltage step simulation waveforms comparison between (i) a first power supply system having four main switching converters, (ii) a second power supply system 300 having four main switching converters and one auxiliary switching converter as shown in FIG. 3, and (iii) a third power supply system 700 having four main switching converters and one auxiliary switching converter as shown in FIG. 7 in response to a voltage reference step of 10% within 5 μs. As shown in FIG. 12A, the voltage overshoot and undershoot is minimized for both power supply systems 300 and 700. As shown in FIG. 12B, the high frequency current of power supply systems 300 and 700 are substantially identical.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A power interface device comprising:
   a main switching converter coupled to an input terminal and an output terminal and configured to operate at a first switching frequency to source current from the input terminal to the output terminal;
   an auxiliary switching converter coupled to the input terminal and the output terminal in parallel with the main switching converter and configured to operate at a second and higher switching frequency than the first switching frequency to source current from the input terminal to the output terminal;
   a feedback circuit configured to sense an output voltage at the output terminal and output a transient signal based on the sensed output voltage and a reference voltage;
   a transient detection circuit configured to detect when a frequency component of the transient signal exceeds a frequency threshold; and
   an auxiliary control circuit operably coupled to the transient detection circuit and configured to activate the auxiliary switching converter when the frequency component of the transient signal exceeds the frequency threshold, to source current from the input terminal to the output terminal during a load transient detected at the output terminal and to deactivate the auxiliary switching converter when the frequency component does not exceed the frequency threshold.

2. The power interface device of claim 1, wherein the transient detection circuit includes:
   a first comparator configured to compare the frequency component of the transient signal with a first threshold and output a first enable signal if the frequency component is lower than the first threshold;
   a second comparator configured to compare the frequency component of the transient signal with a second threshold and output a second enable signal if the frequency component is higher than the second threshold; and a logic gate configured to, upon receiving the first enable signal or the second enable signal, signal the auxiliary control circuit to activate the auxiliary switching converter.

3. The power interface device of claim 2, wherein:
the first threshold is lower than the second threshold,
the first comparator is configured to output a first disable signal if the frequency component is higher than the first threshold,
the second comparator is configured to output a second disable signal if the frequency component is lower than the second threshold, and
the logic gate is configured to signal the auxiliary control circuit to deactivate the auxiliary switching converter upon receiving the first disable signal and the second disable signal.

4. The power interface device of claim 3, wherein the auxiliary control circuit includes:
a third comparator configured to compare a peak voltage with a sensed inductor voltage of the auxiliary switching converter and output a reset signal upon determining the sensed inductor voltage corresponds to the peak voltage;
a fourth comparator configured to compare a bottom voltage with the sensed inductor voltage of the auxiliary switching converter and output a set signal upon determining the sensed inductor voltage corresponds to the bottom voltage; and
a second logical circuit configured to receive the set, reset, and enable signals and in response generate a pulse width modulated signal for driving the auxiliary switching converter.

5. The power interface device of claim 4, wherein:
the pulse width modulated signal includes an activate signal and a deactivate signal,
the activate signal causes the auxiliary switching converter to source current from the input terminal to the output terminal, and
the deactivate signal causes the auxiliary switching converter to sink current from the output terminal to a ground terminal.

6. The power interface device of claim 4, further comprising:
a buffer configured to provide electrical impedance transformation from the feedback circuit to the auxiliary control circuit;
a low pass filter configured to output a lower frequency component of the transient signal; and
a gain amplifier configured to receive the transient signal and the lower frequency component of the transient signal and output a higher frequency component of the transient signal.

7. The power interface device of claim 4, wherein the auxiliary control circuit includes a current-mode control circuit.

8. The power interface device of claim 1, wherein the main switching converter and the auxiliary switching converter include current-mode switching regulators.

9. The power interface device of claim 1, wherein the main switching converter and the auxiliary switching converter include step-down, current mode switching regulators configured to convert a higher input voltage of the input terminal to a lower voltage, the lower voltage being the output voltage.

10. The power interface device of claim 1, wherein:
the main switching converter includes a first main switch, a second main switch, and a main inductor, the first main switch at one end is coupled to the input terminal and at another end is coupled to a main node,
the second main switch at one end is coupled to the main node and at another end is coupled to a ground terminal, and
the main inductor at one end is coupled to the main node and at another end is coupled to the output terminal.

11. The power interface device of claim 10, wherein:
the auxiliary switching converter includes a first auxiliary switch, a second auxiliary switch, and an auxiliary inductor,
the first auxiliary switch at one end is coupled to the input terminal and at another end is coupled to an auxiliary node,
the second auxiliary switch at one end is coupled to the auxiliary node and another end is coupled to the ground terminal, and
the auxiliary inductor at one end is coupled to the auxiliary node and at another end is coupled to the output terminal.

12. The power interface device of claim 11, wherein:
the auxiliary switching converter is configured to source a fast transient high frequency current during the load transient detected at the output terminal and source a fast transient high frequency current with substantially zero low frequency current outside of the load transient, and
the load transient includes a sudden increase or decrease in load current.

13. The power interface device of claim 11, wherein the first and second main switches and the first and second auxiliary switches include FET switches.

14. The power interface device of claim 1, wherein:
the feedback circuit includes a plurality of resistors and capacitors configured to sense the output voltage and generate a feedback voltage, and
the feedback circuit includes an error amplifier configured to receive the feedback voltage and the reference voltage, and generate the transient signal when the feedback voltage and the reference voltage are not substantially equal to each other.

15. The power interface device of claim 14, further comprising:
a low pass filter configured to receive the transient signal and output a lower frequency component of the transient signal; and
a main control circuit configured to control the main switching converter based on the lower frequency component of the transient signal.

16. The power interface device of claim 15, wherein:
the main control circuit includes a main comparator circuit configured to compare the lower frequency component of the transient signal with a sensed low frequency inductor voltage sourced by the main switching converter and generate a main pulse-width signal for driving the main switching converter, and
the main pulse-width signal enables the main switching converter to source a low frequency current tracking the lower frequency component of the transient signal to the output terminal.

17. The power interface device of claim 1, wherein detecting when the frequency component of the transient signal exceeds the frequency threshold comprises the transient detection circuit comparing the frequency component to an operating window range defined by a first threshold and a second threshold, and causing the auxiliary control circuit to activate the auxiliary switching converter when the frequency component of the transient signal falls outside of the operating window range and causing the auxiliary control circuit to deactivate the auxiliary switching converter when the frequency component of the transient signal stays within the operating window range.

18. The power interface device of claim 1, further comprising:
one or more filter circuits configured to separate the transient signal into a higher frequency component and a lower frequency component,
wherein the transient detection circuit detecting when the frequency component of the transient signal exceeds a frequency threshold includes detecting when the higher frequency component of the transient signal exceeds the frequency threshold, and
wherein the transient detection circuit further includes a noise filter configured to filter out noise from the higher frequency component of the transient signal.

19. A power supply system comprising:
a power terminal configured to connect to a power source;
a load terminal configured to connect to a load device and to receive power from the power source; and
a power interface device configured to operably connect the power source to the load device and change a first voltage provided at the power terminal by the power source to a second voltage for operating the load device, wherein the power interface device includes:
a main switching converter coupled to the power source and the load device and configured to operate at a first switching frequency to source current from the power source to the load device;
an auxiliary switching converter coupled to the power terminal and the load terminal in parallel with the main switching converter and configured to operate at a second and higher switching frequency than the first switching frequency to source current from the power source to the load device;
a feedback circuit configured to sense an output voltage at the load terminal and output a transient signal based on the sensed output voltage and a reference voltage;
a transient detection circuit configured to detect when a frequency component of the transient signal exceeds a threshold; and
an auxiliary control circuit operably coupled to the transient detection circuit and configured to activate the auxiliary switching converter when the frequency component of the transient signal exceeds the threshold, to source current from power terminal to the load terminal during a load transient detected at the load terminal and to deactivate the auxiliary switching converter when the frequency component does not exceed the threshold.

20. The power supply system of claim 19, wherein the transient detection circuit includes:
a first comparator configured to compare the frequency component of the transient signal with a first threshold and output a first enable signal if the frequency component is lower than the first threshold;
a second comparator configured to compare the frequency component of the transient signal with a second threshold and output a second enable signal if the frequency component is higher than the second threshold; and
a logic gate configured to, upon receiving the first enable signal or the second enable signal, cause the auxiliary control circuit to activate the auxiliary switching converter.

21. The power supply system of claim 20, wherein:
the first threshold and the second threshold are configured to provide an operating window such that when the frequency component of the transient signal falls outside of the operating window, either the first enable signal or the second enable signal is generated,
the first threshold is lower than the second threshold,
the first comparator is configured to output a first disable signal if the frequency component is higher than the first threshold,
the second comparator is configured to output a second disable signal if the frequency component is lower than the second threshold, and
the logic gate is configured to, upon receiving the first disable signal and the second disable signal, cause the auxiliary control circuit to deactivate the auxiliary switching converter.

22. The power supply system of claim 21, wherein the auxiliary control circuit includes:
a third comparator configured to compare a peak voltage with a sensed inductor voltage of the auxiliary switching converter and output a reset signal upon determining the sensed inductor voltage corresponds to the peak voltage;
a fourth comparator configured to compare a bottom voltage with the sensed inductor voltage of the auxiliary switching converter and output a set signal upon determining the sensed inductor voltage corresponds to the bottom voltage; and
a second logical circuit configured to receive the set, reset, and enable signals and in response generate a pulse width modulated signal for driving the auxiliary switching converter.

\* \* \* \* \*